United States Patent
Minifie et al.

(10) Patent No.: US 11,696,017 B2
(45) Date of Patent: Jul. 4, 2023

(54) USER INTERFACE FOR MANAGING AUDIBLE DESCRIPTIONS FOR VISUAL MEDIA

(71) Applicant: Apple Inc., Cupertino, CA (US)

(72) Inventors: Darren C. Minifie, Santa Cruz, CA (US); Grant P. Maloney, Chesterfield, MO (US); Nandini Kannamangalam Sundara Raman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/547,065

(22) Filed: Dec. 9, 2021

(65) Prior Publication Data

US 2022/0377248 A1    Nov. 24, 2022

Related U.S. Application Data

(60) Provisional application No. 63/197,477, filed on Jun. 6, 2021, provisional application No. 63/190,782, filed on May 19, 2021.

(51) Int. Cl.
*H04N 23/63* (2023.01)
*G06F 3/16* (2006.01)
*H04N 23/61* (2023.01)

(52) U.S. Cl.
CPC .......... *H04N 23/631* (2023.01); *G06F 3/16* (2013.01); *H04N 23/61* (2023.01)

(58) Field of Classification Search
CPC ......... G11B 27/102; G11B 27/34; G06F 3/16; H04N 23/631; H04N 23/61
USPC .................................................. 348/207.99
See application file for complete search history.

(56) References Cited

U.S. PATENT DOCUMENTS

| | | | | |
|---|---|---|---|---|
| 7,542,971 B2* | 6/2009 | Thione | ............... | G10L 15/22 |
| 7,575,171 B2* | 8/2009 | Lev | ............... | H04N 1/00244 |
| | | | | 382/154 |
| 7,908,564 B2* | 3/2011 | Hara | ............... | G06F 40/143 |
| | | | | 715/224 |
| 8,391,697 B2* | 3/2013 | Cho | ............... | H04N 21/4788 |
| | | | | 396/50 |
| 9,075,520 B2* | 7/2015 | Park | ............... | G06F 3/0488 |
| 9,332,182 B2* | 5/2016 | Nonaka | ............... | H04N 9/8227 |
| 9,350,924 B2* | 5/2016 | Posa | ............... | H04N 5/272 |
| 9,541,407 B1 | 1/2017 | Mohler | | |
| 9,900,515 B2* | 2/2018 | Kim | ............... | G06V 40/16 |
| 9,996,976 B2* | 6/2018 | Zhou | ............... | G06T 7/344 |

(Continued)

OTHER PUBLICATIONS

"Apple Previews Powerful Software Updates Designed for People with Disabilities", Available online at: https://www.apple.com/newsroom/2021/05/apple-previews-powerful-software-updates-designed-for-people-with-disabilities/, May 19, 2021, 10 pages.

(Continued)

*Primary Examiner* — Pritham D Prabhakher
(74) *Attorney, Agent, or Firm* — DLA Piper LLP (US)

(57) ABSTRACT

The present disclosure generally relates to user interfaces and techniques for managing audible descriptions for visual media. In some embodiments, the user interfaces and techniques provide different audible descriptions for a portion of a representation of the media, where one audible description is provided before the portion of the representation of the media has been changed and the different audible description is provided after the portion of the representation of the media has been changed.

60 Claims, 20 Drawing Sheets

(56) References Cited

U.S. PATENT DOCUMENTS

| | | | |
|---|---|---|---|
| 10,444,975 B2* | 10/2019 | Murphy | G06F 3/0486 |
| 10,488,218 B2* | 11/2019 | Kim | G02B 27/01 |
| 10,503,820 B2* | 12/2019 | Duggan | G06F 16/9537 |
| 10,572,215 B1 | 2/2020 | Cooper et al. | |
| 10,656,823 B2* | 5/2020 | Mukherjee | G06F 9/542 |
| 10,671,834 B2* | 6/2020 | Adato | G06F 18/2115 |
| 10,882,613 B2* | 1/2021 | Sharma | B64U 10/13 |
| 10,891,800 B1 | 1/2021 | Stoyles et al. | |
| 10,929,443 B2* | 2/2021 | Grochocki, Jr. | G06F 16/29 |
| 11,112,963 B2* | 9/2021 | Chaudhri | H04N 23/631 |
| 11,227,494 B1* | 1/2022 | Stoyles | G01C 21/3602 |
| 11,231,832 B2* | 1/2022 | Yang | G06F 16/951 |
| 2005/0171926 A1 | 8/2005 | Thione et al. | |
| 2007/0074133 A1 | 3/2007 | Hara et al. | |
| 2007/0175998 A1 | 8/2007 | Lev | |
| 2011/0076003 A1 | 3/2011 | Cho et al. | |
| 2011/0257958 A1 | 10/2011 | Kildevaeld | |
| 2013/0016042 A1 | 1/2013 | Makinen et al. | |
| 2014/0117076 A1 | 5/2014 | Eberlein | |
| 2014/0156412 A1 | 6/2014 | Tse | |
| 2014/0267796 A1 | 9/2014 | Jang et al. | |
| 2015/0268928 A1* | 9/2015 | Park | G06V 20/39 345/173 |
| 2016/0005189 A1 | 1/2016 | Gray et al. | |
| 2016/0063339 A1 | 3/2016 | Kwon et al. | |
| 2017/0039765 A1* | 2/2017 | Zhou | G06T 7/521 |
| 2017/0090693 A1* | 3/2017 | Ku | G06V 30/18105 |
| 2017/0336926 A1 | 11/2017 | Chaudhri et al. | |
| 2017/0336960 A1* | 11/2017 | Chaudhri | G06Q 10/107 |
| 2017/0365097 A1 | 12/2017 | Lim et al. | |
| 2018/0066956 A1 | 3/2018 | Kim et al. | |
| 2018/0322076 A1 | 11/2018 | Prasad et al. | |
| 2018/0350144 A1 | 12/2018 | Rathod | |
| 2019/0025999 A1 | 1/2019 | Murphy et al. | |
| 2019/0084670 A1 | 3/2019 | Sharma et al. | |
| 2019/0213212 A1 | 7/2019 | Adato et al. | |
| 2019/0347144 A1 | 11/2019 | Chen et al. | |
| 2020/0050906 A1 | 2/2020 | Mathai | |
| 2021/0193187 A1* | 6/2021 | Phillips | G06V 10/82 |
| 2021/0208741 A1 | 7/2021 | Yang et al. | |
| 2021/0227145 A1* | 7/2021 | Kasugai | H04N 23/671 |
| 2021/0389868 A1* | 12/2021 | Crowder | A63F 13/63 |
| 2022/0269887 A1* | 8/2022 | Chee | H04S 7/304 |
| 2022/0319493 A1* | 10/2022 | Ohishi | G06V 10/82 |
| 2022/0334683 A1 | 10/2022 | Paul et al. | |
| 2022/0334693 A1 | 10/2022 | De Vries et al. | |
| 2022/0337741 A1 | 10/2022 | Paul et al. | |

OTHER PUBLICATIONS

Applicant-Initiated Interview Summary received for U.S. Appl. No. 16/140,286, dated Feb. 20, 2020, 5 pages.
Non-Final Office Action received for U.S. Appl. No. 16/140,286, dated Oct. 3, 2019, 14 pages.
Non-Final Office Action received for U.S. Appl. No. 16/897,551, dated Jun. 25, 2020, 12 pages.
Non-Final Office Action received for U.S. Appl. No. 17/142,134, dated Jul. 22, 2021, 11 pages.
Notice of Allowance received for U.S. Appl. No. 16/140,286, dated Mar. 12, 2020, 5 pages.
Notice of Allowance received for U.S. Appl. No. 16/897,551, dated Oct. 16, 2020, 5 pages.
Stone Zeda, "Could AR Be the Unlikely Savior of Print?", Online available at: https://adage.com/article/digitalnext/ar-savior-print/308923, May 11, 2017, 4 pages.
"Text of 2nd CD Mixed and Augmented Reality (MAR) Reference Model", International Organisation for Standardisation Organisation Internationale De Normalisation, ISO/IEC JTC 1/SC 29/WG 11, Coding of Moving Pictures and Audio, Feb. 2016, 67 pages.
Applicant-Initiated Interview Summary received for U.S. Appl. No. 16/140,211, dated Feb. 13, 2020, 3 pages.
Applicant-Initiated Interview Summary received for U.S. Appl. No. 16/140,211, dated Sep. 3, 2020, 4 pages.
Applicant-Initiated Interview Summary received for U.S. Appl. No. 17/484,714, dated Apr. 28, 2022, 2 pages.
Applicant-Initiated Interview Summary received for U.S. Appl. No. 17/484,714, dated Nov. 10, 2022, 2 pages.
Applicant-Initiated Interview Summary received for U.S. Appl. No. 17/484,856, dated Jul. 27, 2022, 7 pages.
Applicant-Initiated Interview Summary received for U.S. Appl. No. 17/484,856, dated Mar. 10, 2022, 3 pages.
Decision on Appeal received for U.S. Appl. No. 16/140,211, mailed on Jul. 1, 2021, 8 pages.
Ex-Parte Quayle Action received for U.S. Appl. No. 17/484,844, mailed on Sep. 8, 2022, 8 pages.
Examiner's Answer to Appeal Brief received for U.S. Appl. No. 16/140,211, dated Mar. 25, 2021, 21 pages.
Final Office Action received for U.S. Appl. No. 16/140,211, dated May 26, 2020, 22 pages.
Final Office Action received for U.S. Appl. No. 17/484,714, dated May 23, 2022, 22 pages.
Final Office Action received for U.S. Appl. No. 17/484,856, dated Mar. 30, 2022, 26 pages.
International Search Report and Written Opinion received for PCT Patent Application No. PCT/US2022/025096, dated Sep. 26, 2022, 19 pages.
Invitation to Pay Additional Fees received for PCT Patent Application No. PCT/US2022/025096, dated Aug. 1, 2022, 11 pages.
Non-Final Office Action received for U.S. Appl. No. 16/140,211, dated Oct. 3, 2019, 15 pages.
Non-Final Office Action received for U.S. Appl. No. 17/484,714, dated Dec. 1, 2021, 19 pages.
Non-Final Office Action received for U.S. Appl. No. 17/484,856, dated Dec. 8, 2021, 24 pages.
Notice of Allowance received for U.S. Appl. No. 16/140,211, dated Sep. 10, 2021, 10 pages.
Notice of Allowance received for U.S. Appl. No. 17/142,134, dated Jan. 4, 2022, 5 pages.
Notice of Allowance received for U.S. Appl. No. 17/484,844, dated Jan. 17, 2023, 10 pages.
Supplemental Notice of Allowance received for U.S. Appl. No. 17/142,134, dated Jan. 12, 2022, 2 pages.

* cited by examiner

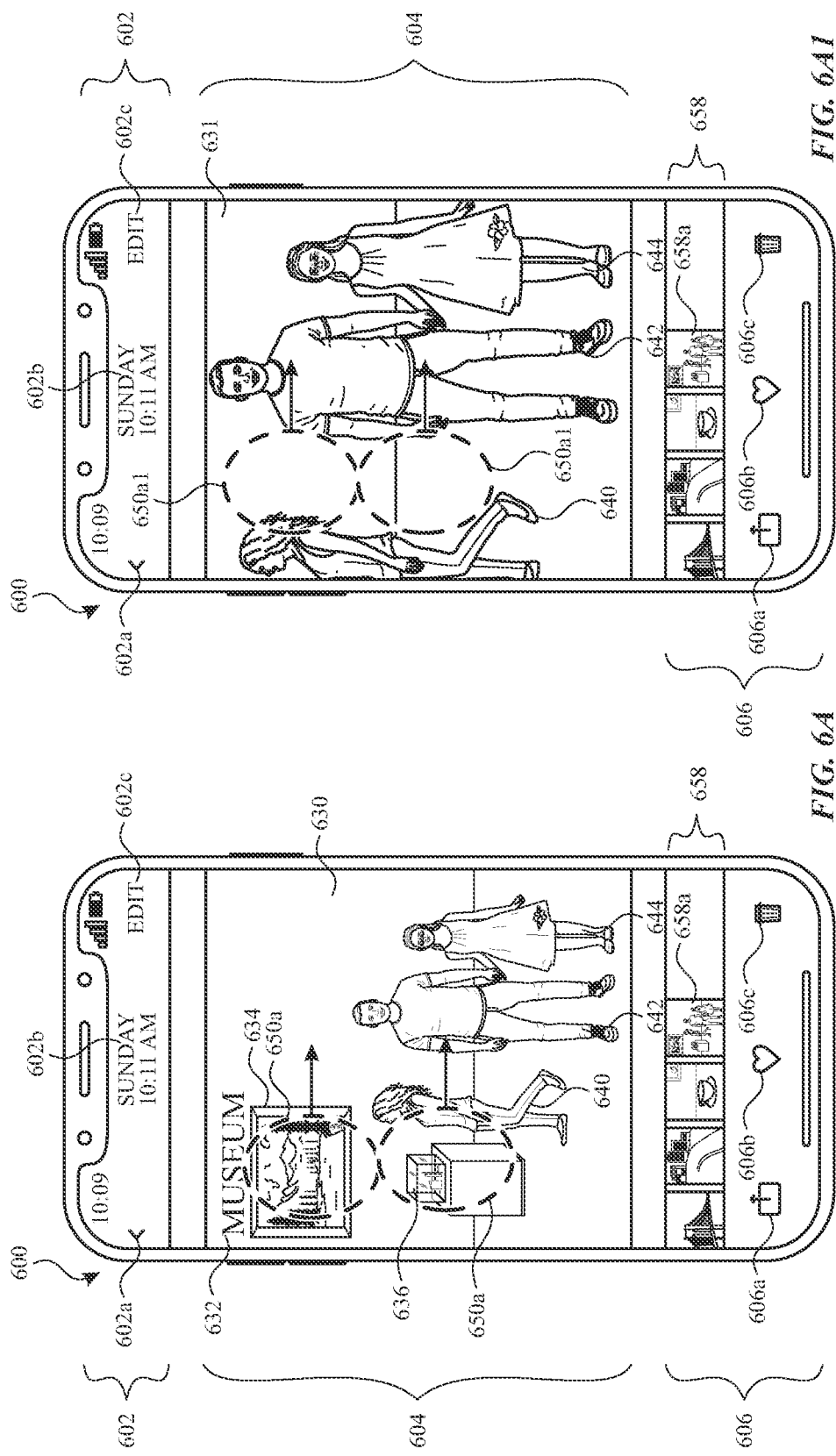

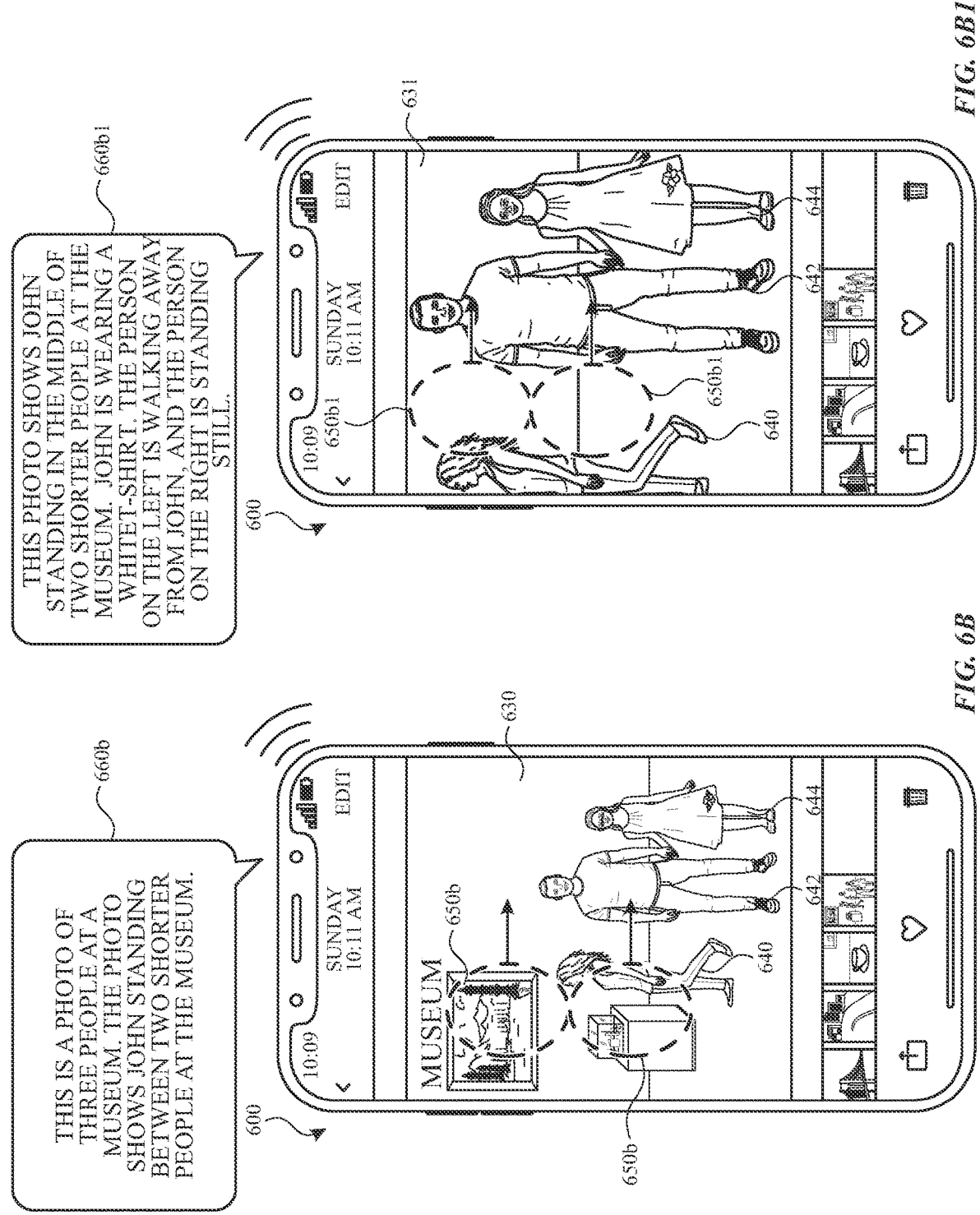

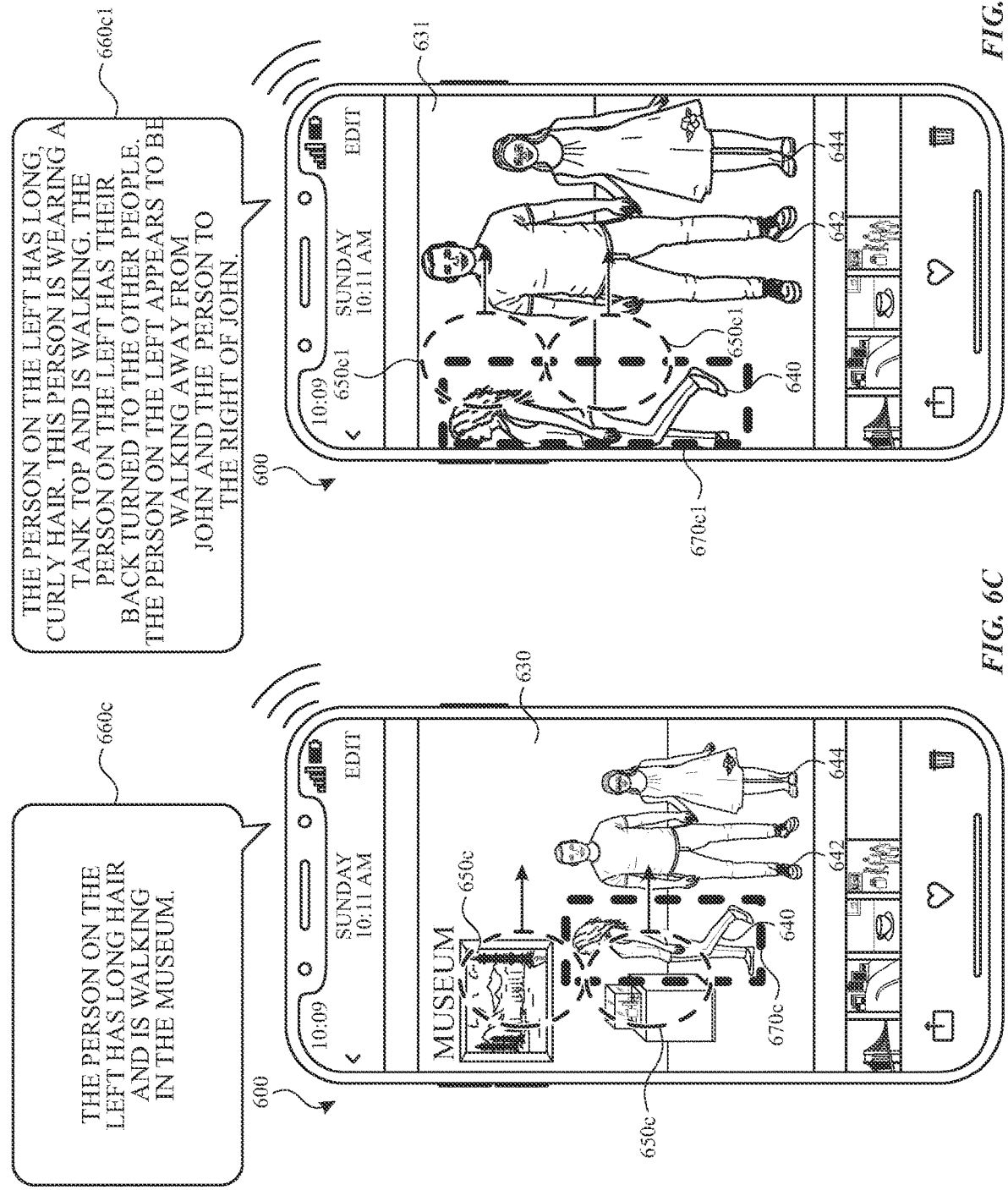

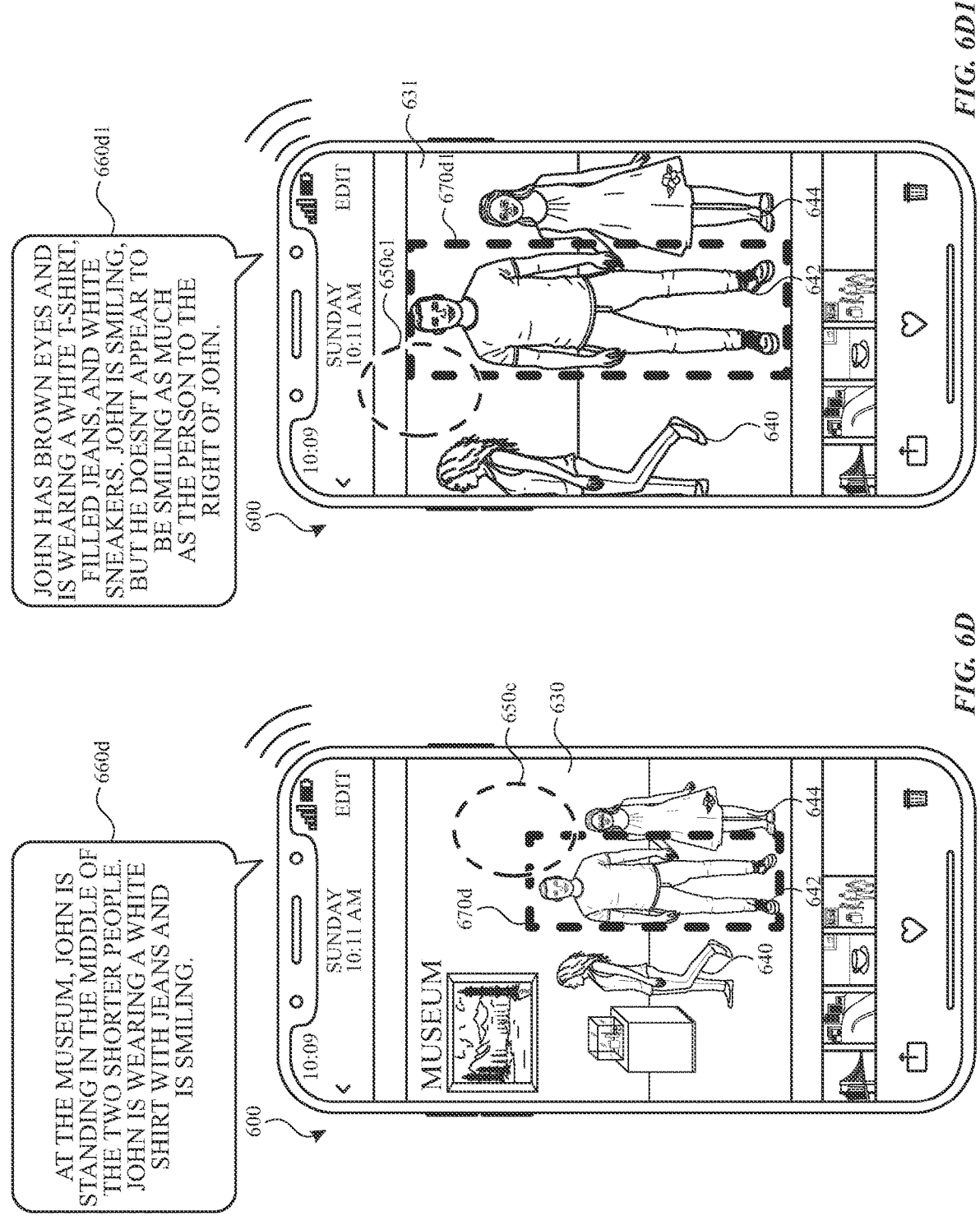

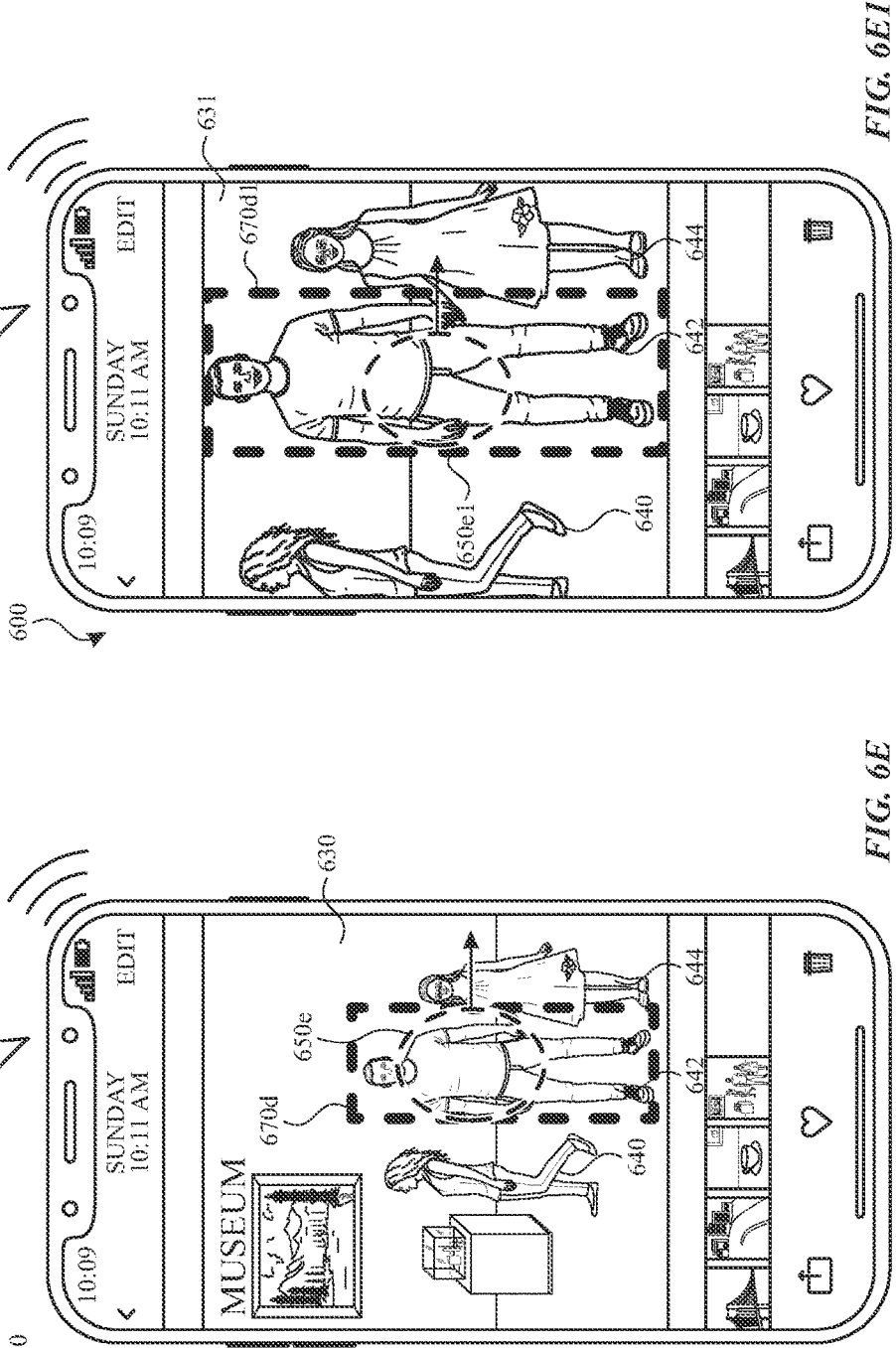

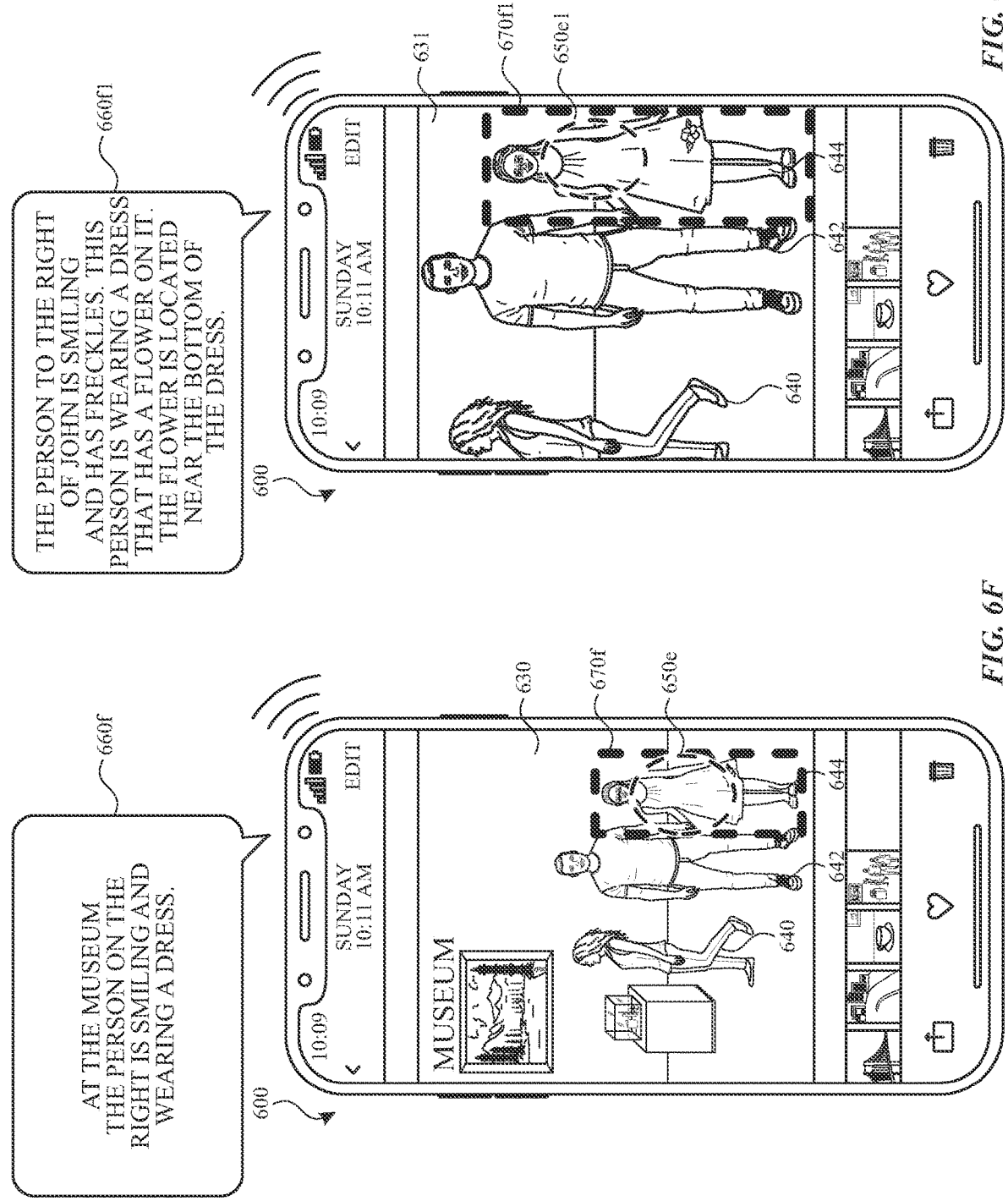

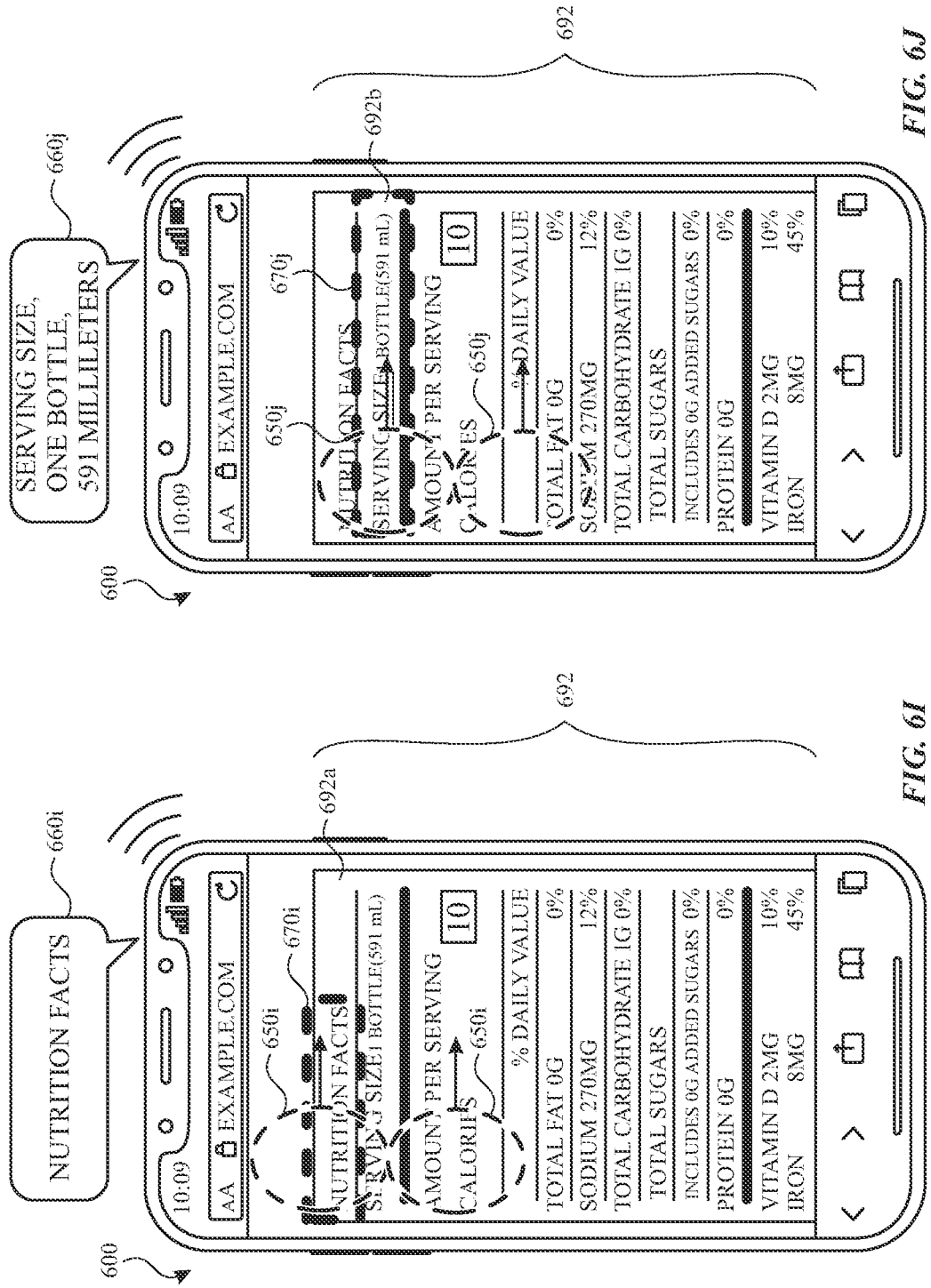

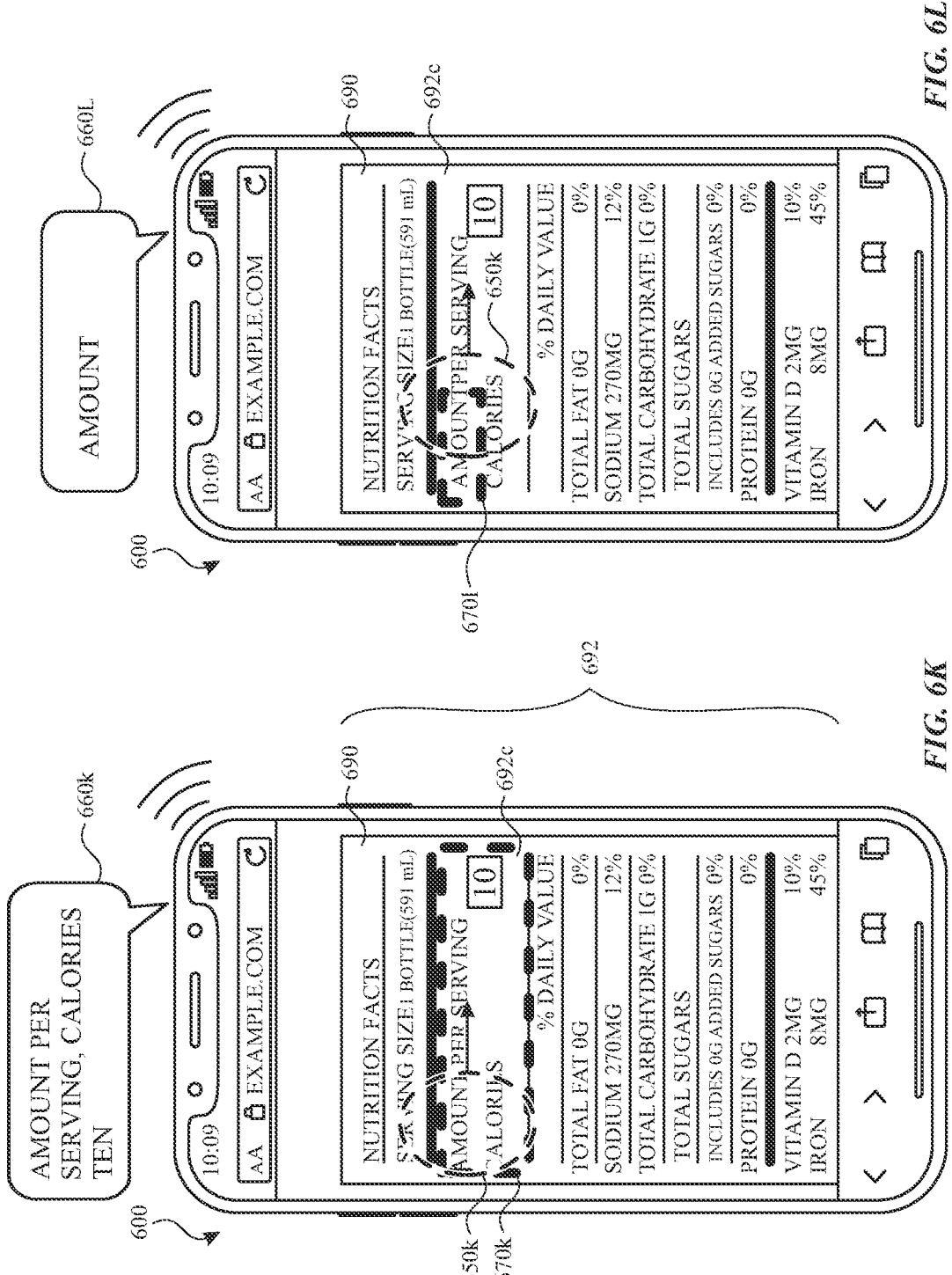

USER INTERFACE FOR MANAGING AUDIBLE DESCRIPTIONS FOR VISUAL MEDIA

CROSS-REFERENCE TO RELATED APPLICATIONS

This application claims priority to U.S. Provisional Patent Application Ser. No. 63/197,477, entitled "USER INTERFACE FOR MANAGING AUDIBLE DESCRIPTIONS FOR VISUAL MEDIA," filed on Jun. 6, 2021 and U.S. Provisional Patent Application Ser. No. 63/190,782, entitled "USER INTERFACE FOR MANAGING AUDIBLE DESCRIPTIONS FOR VISUAL MEDIA," filed on May 19, 2021. The contents of which are hereby incorporated by reference in their entireties.

FIELD

The present disclosure relates generally to computer user interfaces, and more specifically to techniques for managing audible descriptions for visual media.

BACKGROUND

Users of smartphones and other personal electronic devices are more frequently capturing, storing, and editing media for safekeeping memories and sharing with friends. Some existing techniques allowed users to capture images or videos. Users can engage with media such media by, for example, capturing, storing, and editing the media.

BRIEF SUMMARY

Some techniques for managing audible descriptions for visual media using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing audible descriptions for visual media. Such methods and interfaces optionally complement or replace other methods for managing audible descriptions for visual media. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component, one or more input devices, and one or more output devices. The method comprises: displaying, via a display generation component, a camera user interface that includes a representation of media; while displaying the representation of the media, detecting, via the one or more inputs devices, a first input directed to a portion of the representation of the media; in response to detecting the first input directed to the portion of the representation of the media, providing, via the one or more output devices, a first audible description that corresponds to the portion of the representation of the media; after providing the first audible description that corresponds to the portion of the representation of the media, detecting a request to change display of the portion of the representation of the media; in response to detecting the request to change display of the portion of the representation of the media, changing the display of the portion of the representation of the media; while the display of the portion of the representation of the media is changed, detecting a second input directed to the portion of the representation of the media; and in response to detecting the second input directed to the portion of the representation of the media, providing, via the one or more output devices, a second audible description that corresponds to the portion of the representation of the media, wherein the second audible description is different from the first audible description.

In accordance with some embodiments a non-transitory computer readable storage is described. The non-transitory computer-readable storage medium stores one or more programs configured to be executed by one or more processors of a computer system, wherein the computer system is in communication with a display generation component, one or more input devices, and one or more output devices, the one or more programs including instructions for: displaying, via a display generation component, a camera user interface that includes a representation of media; while displaying the representation of the media, detecting, via the one or more inputs devices, a first input directed to a portion of the representation of the media; in response to detecting the first input directed to the portion of the representation of the media, providing, via the one or more output devices, a first audible description that corresponds to the portion of the representation of the media; after providing the first audible description that corresponds to the portion of the representation of the media, detecting a request to change display of the portion of the representation of the media; in response to detecting the request to change display of the portion of the representation of the media, changing the display of the portion of the representation of the media; while the display of the portion of the representation of the media is changed, detecting a second input directed to the portion of the representation of the media; and in response to detecting the second input directed to the portion of the representation of the media, providing, via the one or more output devices, a second audible description that corresponds to the portion of the representation of the media, wherein the second audible description is different from the first audible description.

In accordance with some embodiments a transitory computer readable storage is described. The transitory computer-readable storage medium stores one or more programs configured to be executed by one or more processors of a computer system, wherein the computer system is in communication with a display generation component, one or more input devices, and one or more output devices, the one or more programs including instructions for: displaying, via a display generation component, a camera user interface that includes a representation of media; while displaying the representation of the media, detecting, via the one or more inputs devices, a first input directed to a portion of the representation of the media; in response to detecting the first input directed to the portion of the representation of the media, providing, via the one or more output devices, a first audible description that corresponds to the portion of the representation of the media; after providing the first audible description that corresponds to the portion of the representation of the media, detecting a request to change display of the portion of the representation of the media; in response to detecting the request to change display of the portion of the representation of the media, changing the display of the portion of the representation of the media; while the display of the portion of the representation of the media is changed, detecting a second input directed to the portion of the representation of the media; and in response to detecting the second input directed to the portion of the representation of the media, providing, via the one or more output devices, a second audible description that corresponds to the portion of the representation of the media, wherein the second audible description is different from the first audible description.

In accordance with some embodiments, a computer system is described. The computer system comprises one or more processors, wherein the computer system is in communication with a display generation component, one or more input devices and one or more output devices; and memory storing one or more programs configured to be executed by the one or more processors, the one or more programs including instructions for: displaying, via a display generation component, a camera user interface that includes a representation of media; while displaying the representation of the media, detecting, via the one or more inputs devices, a first input directed to a portion of the representation of the media; in response to detecting the first input directed to the portion of the representation of the media, providing, via the one or more output devices, a first audible description that corresponds to the portion of the representation of the media; after providing the first audible description that corresponds to the portion of the representation of the media, detecting a request to change display of the portion of the representation of the media; in response to detecting the request to change display of the portion of the representation of the media, changing the display of the portion of the representation of the media; while the display of the portion of the representation of the media is changed, detecting a second input directed to the portion of the representation of the media; and in response to detecting the second input directed to the portion of the representation of the media, providing, via the one or more output devices, a second audible description that corresponds to the portion of the representation of the media, wherein the second audible description is different from the first audible description.

In accordance with some embodiments, a computer system is described. The computer system is in communication with a display generation component, one or more input devices, and one or more output devices. The computer system comprises: means for displaying, via a display generation component, a camera user interface that includes a representation of media; means, while displaying the representation of the media, for detecting, via the one or more inputs devices, a first input directed to a portion of the representation of the media; means, responsive to detecting the first input directed to the portion of the representation of the media, for providing, via the one or more output devices, a first audible description that corresponds to the portion of the representation of the media; means, after providing the first audible description that corresponds to the portion of the representation of the media, for detecting a request, to change display of the portion of the representation of the media; means, responsive to detecting the request to change display of the portion of the representation of the media, for changing the display of the portion of the representation of the media; means, while the display of the portion of the representation of the media is changed, for detecting a second input directed to the portion of the representation of the media; and means, responsive to detecting the second input directed to the portion of the representation of the media, for providing, via the one or more output devices, a second audible description that corresponds to the portion of the representation of the media, wherein the second audible description is different from the first audible description.

In accordance with some embodiments, a computer program product is described. The computer program product comprises one or more programs configured to be executed by one or more processors of a computer system that is in communication with a display generation component, one or more input devices, and one or more output devices, the one or more programs including instructions for: displaying, via a display generation component, a camera user interface that includes a representation of media; while displaying the representation of the media, detecting, via the one or more inputs devices, a first input directed to a portion of the representation of the media; in response to detecting the first input directed to the portion of the representation of the media, providing, via the one or more output devices, a first audible description that corresponds to the portion of the representation of the media; after providing the first audible description that corresponds to the portion of the representation of the media, detecting a request to change display of the portion of the representation of the media; in response to detecting the request to change display of the portion of the representation of the media, changing the display of the portion of the representation of the media; while the display of the portion of the representation of the media is changed, detecting a second input directed to the portion of the representation of the media; and in response to detecting the second input directed to the portion of the representation of the media, providing, via the one or more output devices, a second audible description that corresponds to the portion of the representation of the media, wherein the second audible description is different from the first audible description.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing audible descriptions for visual media, thereby increasing the effectiveness, efficiency, and user satisfaction with such devices. Such methods and interfaces may complement or replace other methods for managing audible descriptions for visual media.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6M illustrate exemplary user interfaces for managing audible descriptions for visual media in accordance with some embodiments.

DESCRIPTION OF EMBODIMENTS

Figure 1A:
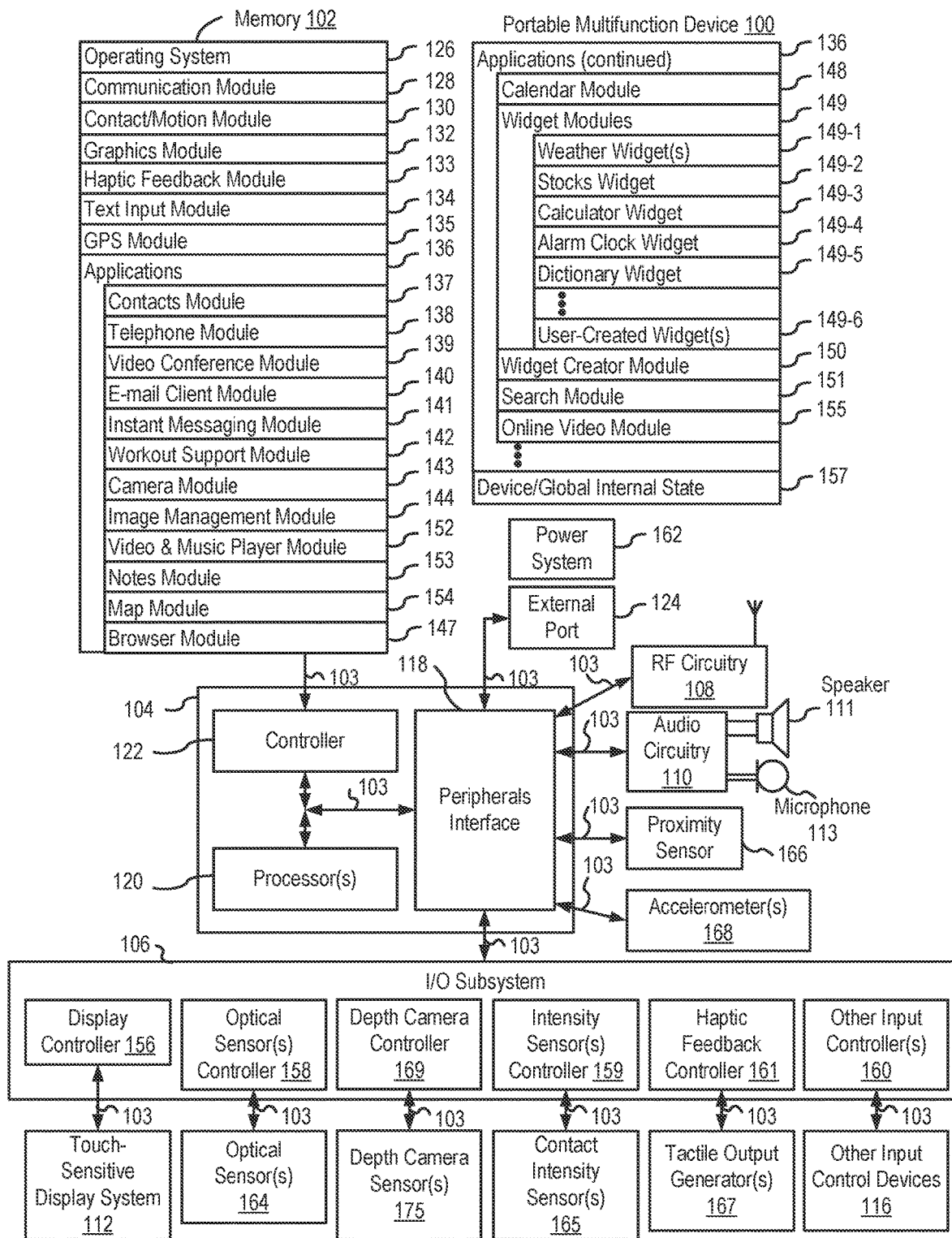
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing audible descriptions for visual media. For example, a user may want to interact with media and hear audible descriptions based on the representation of the media that is currently displayed on a user's device. Such techniques can reduce the cognitive burden on a user who managing audible descriptions for visual media, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques managing audible descriptions for visual media. FIGS. 6A-6M illustrate exemplary user interfaces for managing audible descriptions for visual media in accordance with some embodiments. FIG. 7A-7B are a flow diagram illustrating methods for managing audible descriptions for visual media in accordance with some embodiments. The user interfaces in FIGS. 6A-6M are used to illustrate the processes described below, including the processes in FIGS. 7A-7B.

The processes described below enhance the operability of the devices and make the user-device interfaces more efficient (e.g., by helping the user to provide proper inputs and reducing user mistakes when operating/interacting with the device) through various techniques, including by providing improved feedback (e.g., audio, visual, haptic) to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a. respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals, RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175, such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No.: 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228.737. "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power convener or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector in Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
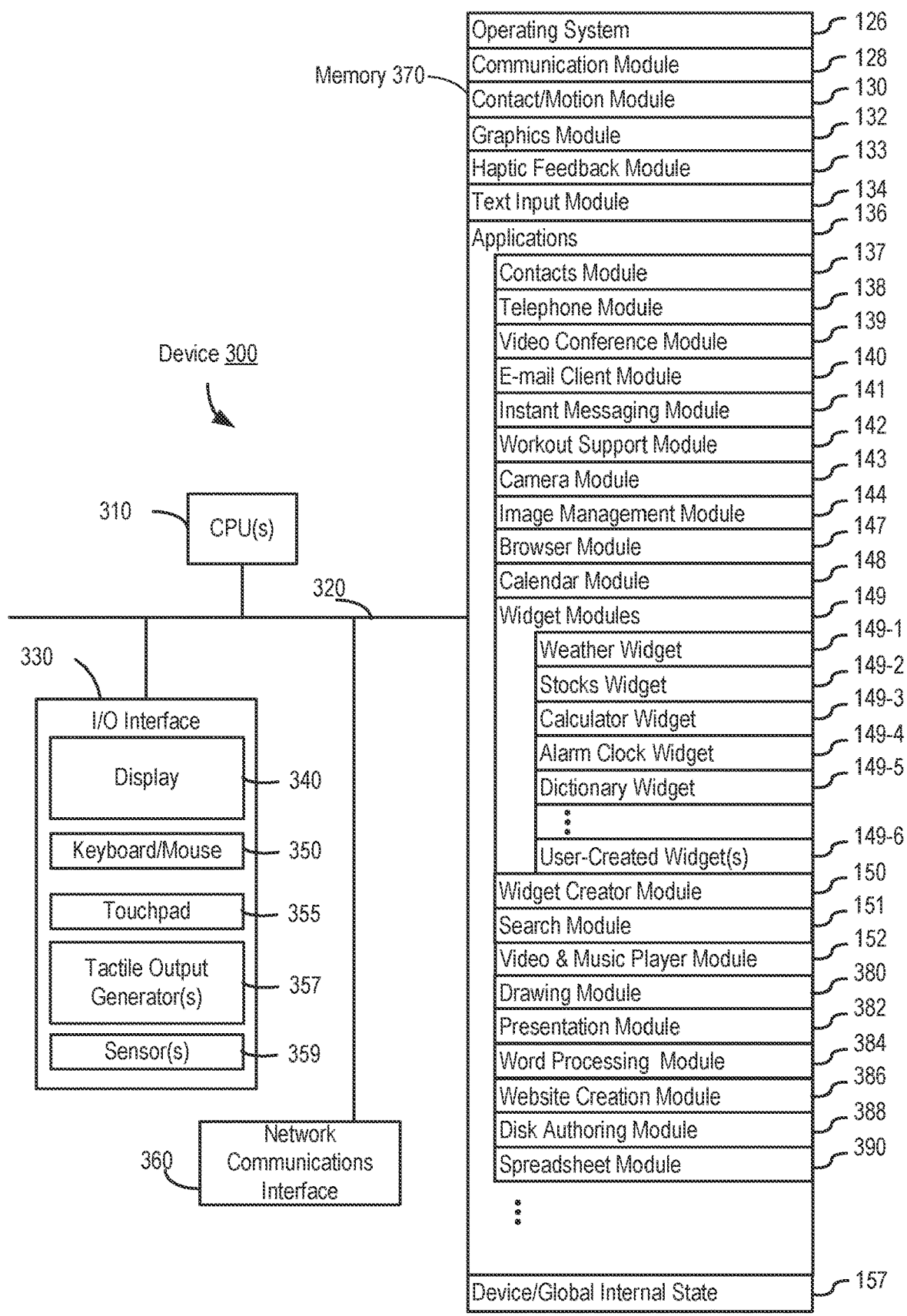
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE- WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
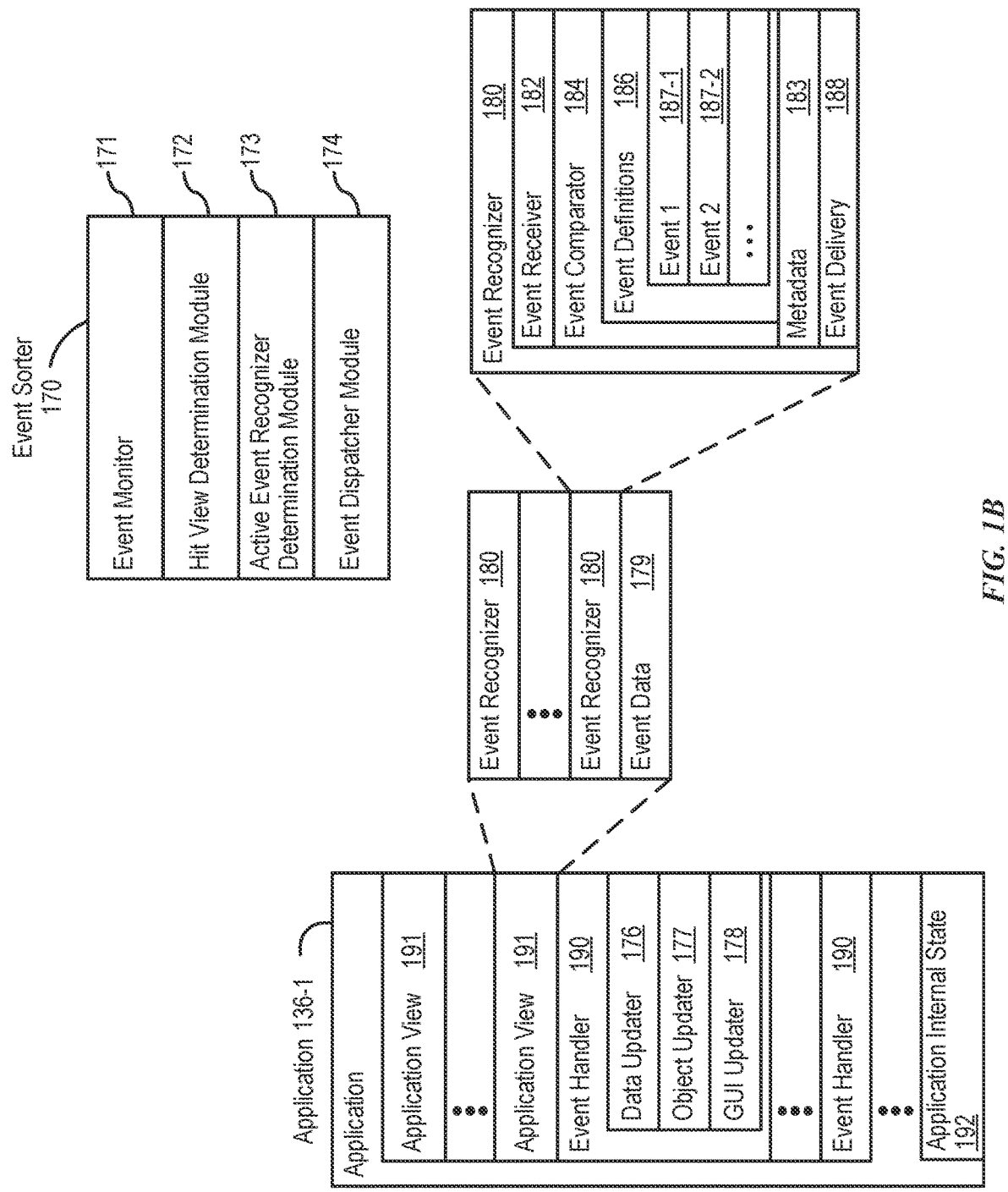
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from 110 subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur.

The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement, Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1, For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
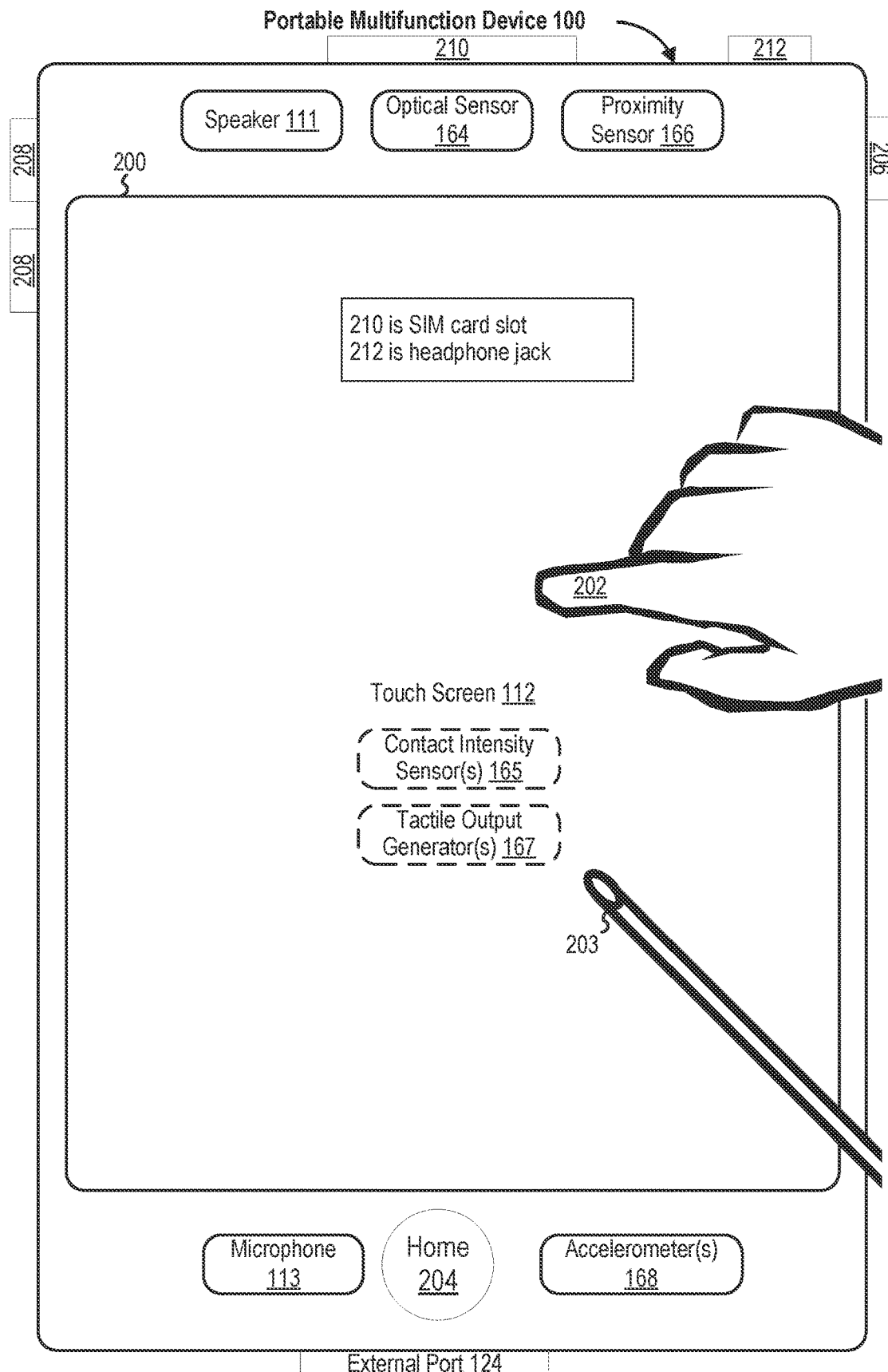
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SINT) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
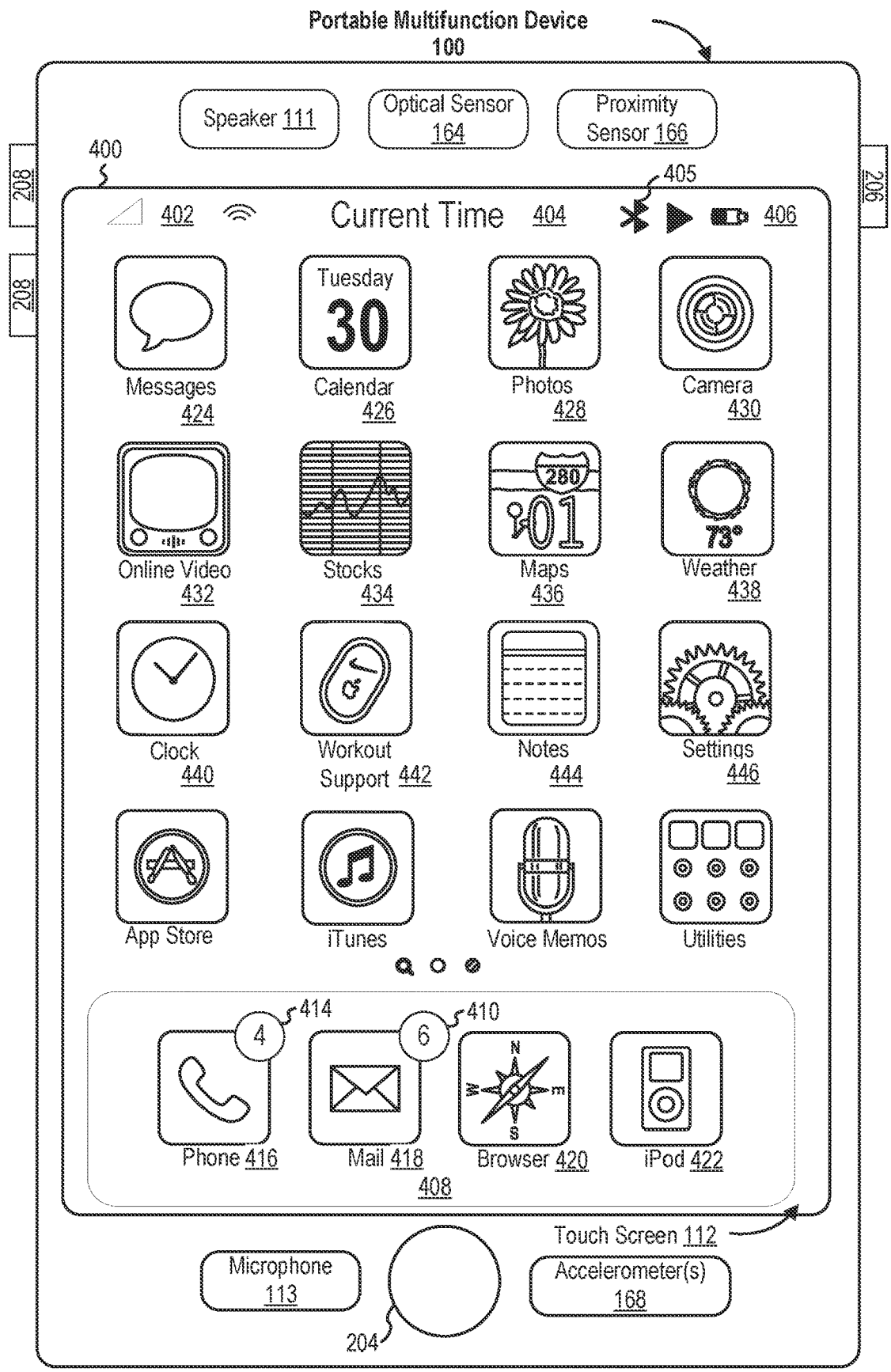
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
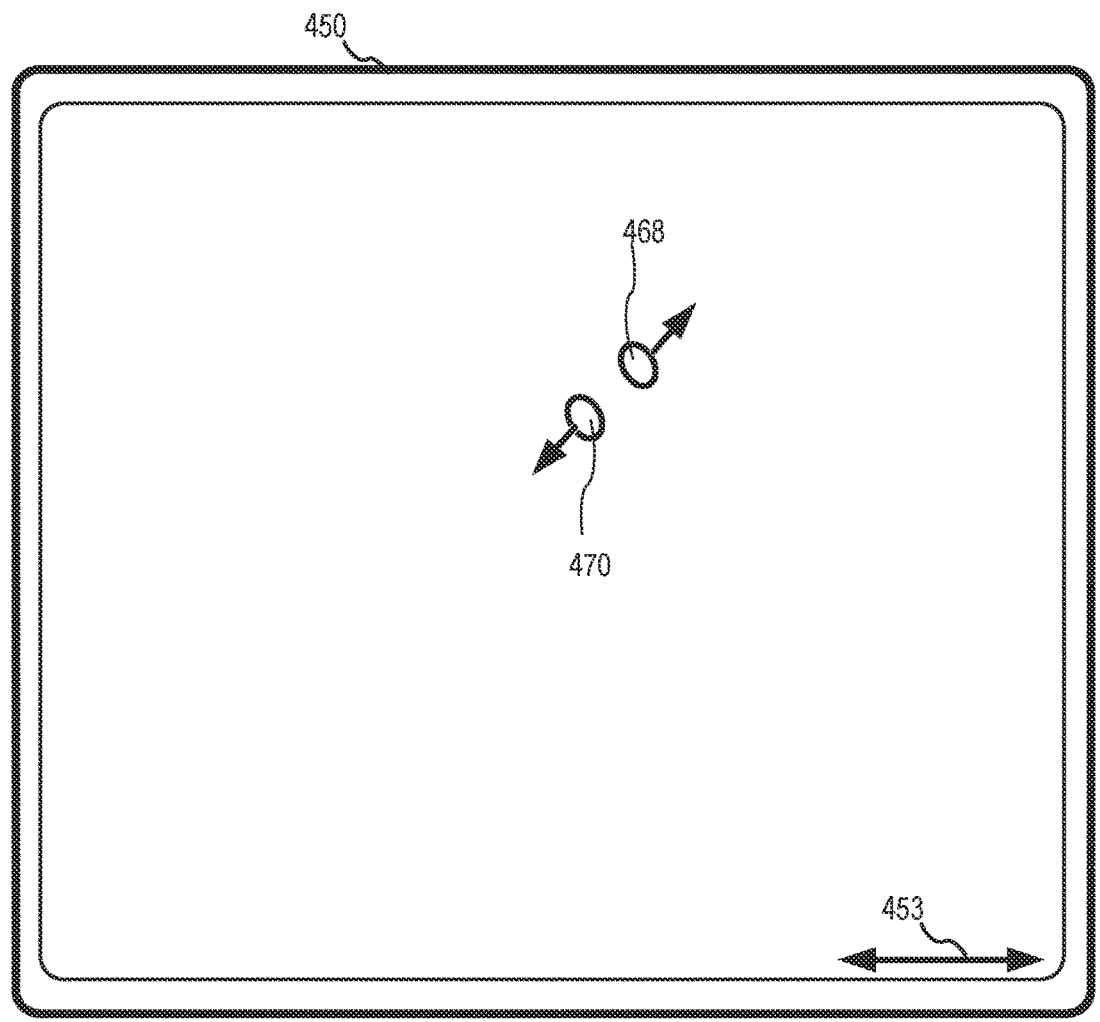
FIG. 4B illustrates an exemplary user interface for a multifunction device with a touch-sensitive surface that is separate from the display in accordance with some embodiments.
Figure 4B:
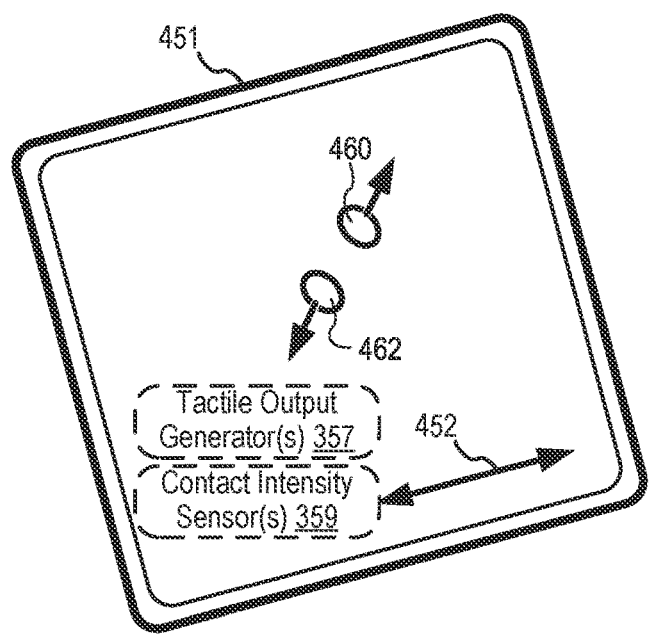

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
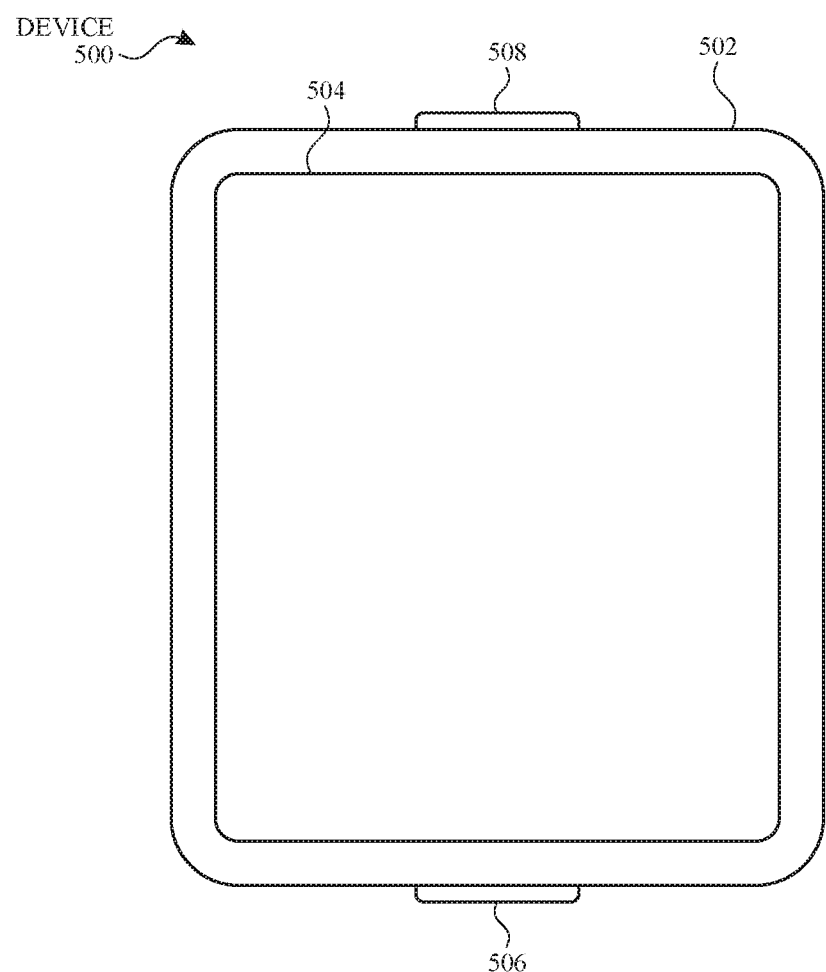
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
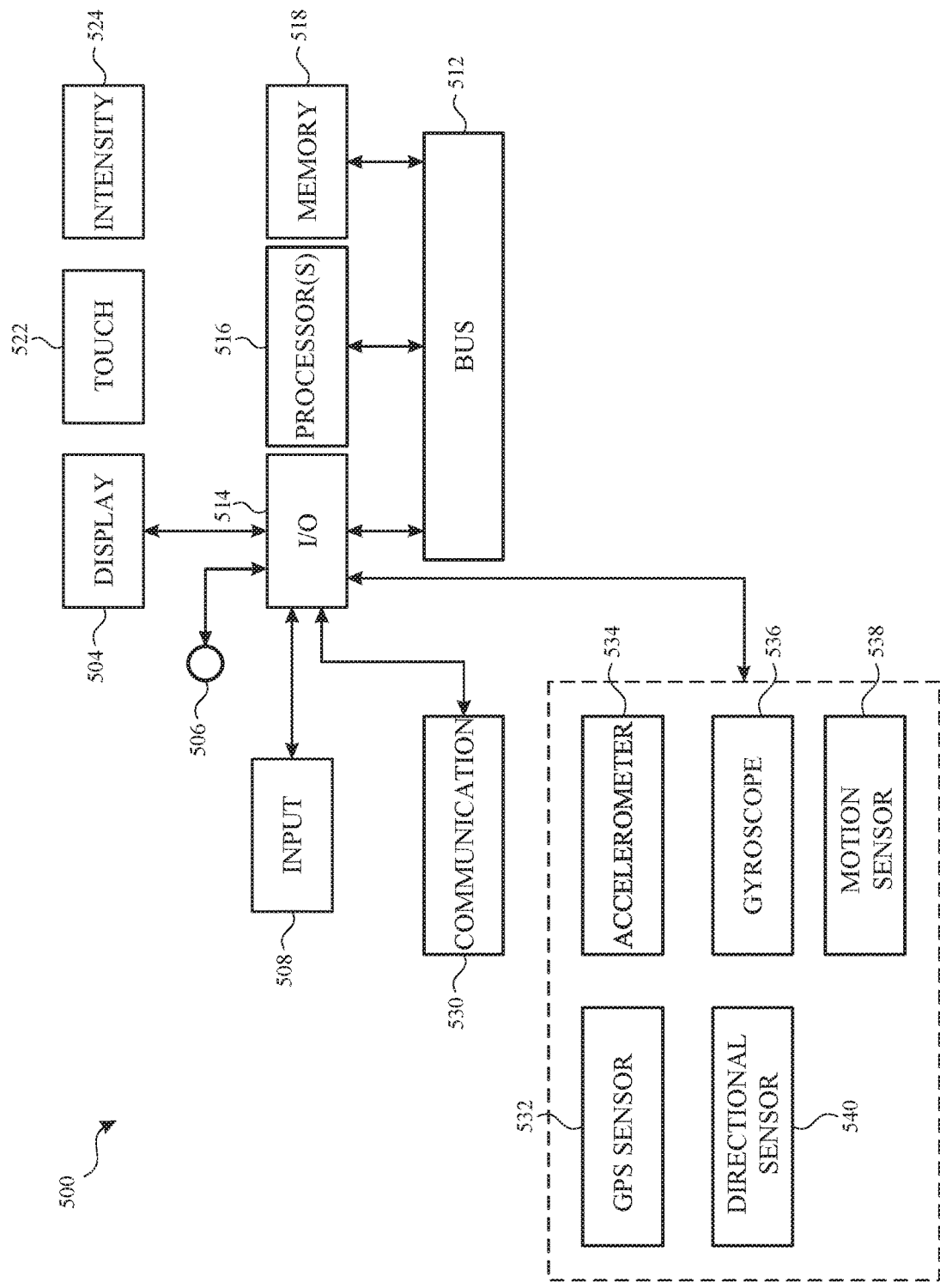
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples 110 section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process described in relation to method 700 (FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations, As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance, As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for managing audible descriptions for visual media in accordance with some embodiments. The user interfaces in FIGS. 6A-6M are used to illustrate the processes described below, including the processes in FIGS. 7A-7B.

FIGS. 6A-6F1 illustrate two exemplary scenarios that are used to describe exemplary user interfaces for managing audible descriptions for visual media. In particular, FIGS. 6A, 6B, 6C, 6D, 6E, and 6F illustrate a scenario where computer system 600 displays media representation 630 (e.g., as shown in FIG. 6A) and outputs audible descriptions concerning media representation 630. Moreover, FIGS. 6A1, 6B1, 6C1, 6D1, 6E1, and 6F1 illustrate a scenario where computer system 600 displays media representation 631 (e.g., as shown in FIG. 6A1) and outputs audible descriptions concerning media representation 631. In FIGS. 6A-6A1, media representation 630 and media representation 631 represent the same media item (e.g., both are composed of visual content (e.g., data) that was captured by one or more cameras during a particular instance in time). As illustrated in FIGS. 6A and 6A1, media representation 630 of FIG. 6A is a zoomed out and panned (e.g., scrolled and/or translated) version of media representation 631 of FIG. 6A1. In some embodiments, in response to detecting a request to zoom media representation 630, computer system 600 displays media representation 631 (or vice-versa). In some embodiments, in response to detecting a request to pan and/or scroll media representation 630, computer system displays media representation 631 (or vice-versa). In some embodiments, computer system 600 detects the request to zoom media representation 630 and/or the request to pan and/or scroll media representation 630 upon detecting an input (e.g., swipe input, pinch input, and/or de-pinch input) on media representation 630. In some embodiments, computer system 600 detects a different type of input to detect a request to zoom media representation 630 than the type of input that computer system 600 detects to detect a request to pan and/or scroll media representation 630. As described below in relation to FIGS. 6A-6F1, computer system 600 outputs different audible descriptions for the same portions (e.g., an area of a media representation that includes the same objects, people, and/or text) of media representation 630 and media representation 631, although media representation 630 and media representation 631 represent the same media item.

FIG. 6A illustrates computer system 600 displaying a media viewer user interface that includes media viewer region 604 positioned between application control region 602 and application control region 606. Media viewer region 604 of FIG. 6A includes media representation 630, which is an enlarged version of thumbnail media representation 658a. Media viewer region 604 is not substantially overlaid with controls, while application control region 602 and application control region 606 are substantially overlaid with controls. Application control region 602 includes time indicator 602b (e.g., "10:11 AM" in FIG. 6A) that indicates the time at which currently displayed media representation was taken, back control 602a (e.g., where, in response to detecting selection of back control 602a, computer system 600 displays a media gallery user interface that includes multiple representations of media) and edit control 602c (e.g., where, in response to detecting selection of edit control 602c, computer system 600 display a media editing user interface that includes one or more controls for editing a representation of the media). Application control region 606 includes thumbnail media representations 660 that are displayed in a single row. Thumbnail media representations 658 includes thumbnail representation 658a, and thumbnail representation 658a is selected because media representation 630 is displayed. In addition, application control region 606 includes send control 606a (e.g., where, in response to detecting selection of send control 606a, computer system 600 initiates a process for transmitting a media item represented by the enlarged media representation to one or more recipients), favorite control 606b (e.g., where, in response to detecting selection of favorite control 606b, computer system 600 sets and/or unsets the currently displayed media representation (e.g., media representation 630) as a favorite media representation), and trash control 606c (e.g., where, in response to detecting selection of trash control 606c, computer system deletes (or initiate a process for deleting) the currently displayed media representation).

FIG. 6A1 illustrates computer system 600 displays the same media view user interface that was displayed in FIG. 6A, excluding media representation 630. Instead of displaying media representation 630, computer system 600 displays media representation 631 in media viewer region 604 at FIG. 6A1. As discussed above, media representation 630 of FIG. 6A is a zoomed out and panned version of media representation 631 of FIG. 6A1. Thus, media representation 630 and media representation 631 includes one or more of the same portions of the visual content of the media item represented by media representation 630 and media representation 631. Notably, thumbnail representation 658a at FIG. 6A1 is the same as thumbnail representation 658a at FIG. 6A, which resembles media representation 630 instead of media representation 631. In some embodiments, thumbnail representation 658a at FIG. 6A1 is the same as thumbnail representation 658a at FIG. 6A because computer system 600 displayed the user interface of FIG. 6A1 in response to detecting a request to zoom and/or a request to pan/scroll media representation 630 of FIG. 6A. In some embodiments, thumbnail representation 658a of FIG. 6A1 is different form thumbnail representation 658a at FIG. 6A, such that thumbnail representation 658a of FIG. 6A1 is a smaller version of media representation 631.

As illustrated in FIGS. 6A and 6A1, media representation 630 and media representation 631 both show three people (e.g., person 640, person 642, and person 644) that are positioned near each other at a museum (e.g., as indicated by sign 632 ("museum") in FIG. 6A). Person 642 is positioned between person 640 and 644 in both media representations 630 of FIG. 6A and media representation 631 of FIG. 6A1. Person 640 is on the left of person 642, and person 644 is on the right of person 642. The people in media representation 631 (e.g., and other portions of the representation of media) are enlarged when compared to media representation 630 (e.g., because media representation 631 is a zoomed version of media representation 630, one or more portions of media representation 630 have been enlarged and/or zoomed). Media representation 630 of FIG. 6A also includes sign 632 ("museum"), art 634, and visual display 636 that are not included in media representation 631 of FIG. 6A1. Because media representation 631 is a zoomed and panned version of media representation 630, less of the visual content of the media (e.g., represented by the media representations 630 and 631) is displayed in media representation 631.

At FIG. 6A, computer system 600 detects movement input 650a, and at FIG. 6A1, computer system 600 detects movement input 650a1. Movement input 650a is the same type of movement input as movement input 650a1, which is a multi-finger (e.g., two-finger) swipe gesture. In some embodiments, movement input 650a and/or movement input 650a1 are different types of inputs that cause computer system to perform the same operations that are described below (e.g., in relation to FIGS. 6B and 6B1). In some embodiments, movement input 650a and/or movement input 650a1 is a tap input (e.g., a non-movement input) that is on a portion of the media view user interface (e.g., a portion of media representation 630 and/or a portion of media representation 631). In some embodiments, movement input 650a and/or movement input 650a1 is a single-finger swipe and/or drag gesture that is detected on the portion of the media view user interface. In some embodiments, when movement input 650a and/or movement input 650a1 is tap input, a swipe input (e.g., a single swipe input), and/or a drag input, computer system 600 outputs an audible description based on the detected location of movement input 650a and/or movement input 650a1, where the detected location corresponds to a location within a particular portion of a displayed media representation. In some embodiments (e.g., as described below), movement input 650a and/or movement input 650b is a multi-swipe input, computer system 600 makes a determination that movement input 650a and/or movement input 650a1 is directed to the "next" portion of a media representation for which computer system 600 is configured to provide an audible description, and computer system 600 provides an audible description concerning the next portion (e.g., the determined next portion) of the representation. In some embodiments, one or more inputs types can be swapped with other input types to cause computer system 600 to perform similar operations, and the description herein is not limited to the combination of input types discussed herein to perform a particular operation.

As illustrated in FIG. 6B, in response to movement input 650a, computer system 600 outputs audible description 660b ("This is a photo of three people at a museum. The photo shows John standing between two shorter people at the museum."). Audible description 660b includes information concerning the media item (e.g., represented by media representation 630 and media representation 631) as a whole (e.g., "this is a photo of three people at a museum") that is followed by information concerning a particular portion of the media item (e.g., ". . . John standing between two shorter people at the museum."). On the other hand, in response to movement input 650a1, computer system 600 outputs audible description 660b1 ("This photo shows John standing in the middle of two shorter people at the museum. Josh is wearing a white t-shirt. The person on the left is walking away from John, and the person on the right is standing still."), as illustrated in FIG. 6B1.

Notably, audible description 660b and audible description 660b1 both identify person 642 (e.g., person standing in the middle of person 640 and person 644) as John. However, audible description 660b and audible description 660b1 do not include the names for person 640 (e.g., one of the "two shorter people" in audible description 660b and "the person on the left" in audible description 660b1) and person 644 (e.g., one of the "two shorter people" in audible description 660b and "the person on the right" in audible description 660b1). In some embodiments, computer system 600 includes a name for person 642 ("John") and does not include names for person 640 and person 644 because computer system 600 is able to identify one or more attributes (e.g., the face) of person 642 as a known person ("John") and is not able to identify person 640 or person 644 as a known person. In some embodiments, computer system 600 identifies person 642 ("John") by making a determination that the face of person 642 in the media item (e.g., represented by media representations 630 and 631) matches (e.g., significantly matches) one or more known faces and/or previously identified faces. In some embodiments, one or more known faces and/or previously identified faces are identified in relation to other media items (e.g., other media items that are stored on computer system 600). In some embodiments, the other media items are stored on computer system 600 in a photo library. In some embodiments, the user has manually identified and/or tagged (e.g., providing information relating to) a face of user in other media items by informing a computer system that a user's information (e.g., name, e-mail, phone number) belongs to a particular face that is included in one or more of the other media items. In some embodiments, the user's information is associated with contact information, such as an e-mail address and/or a phone number. In some embodiments, computer system 600 identifies person 642 ("John") by making a determination that the face of person 642 in the media item matches one or more known faces and/or previously identified faces that are identified via contact information (e.g., stored on and/or accessibly to computer system 600), such as an e-mail address and/or a phone number that is associated with (e.g., included in a contact card for) a particular user. In some embodiments, because a determination is made that the face of person 642 matches a known and/or previously identified face, computer system 600 identifies person 642 in one or more audible descriptions based on the name associated with the known and/or previously identified face. In some embodiments, computer system 600 identifies other subjects, such as objects and/or animals using one or more similar techniques discussed in relation to identifying a name of a person. In some embodiments, computer system 600 identifies and/or adds other characteristics of a person (e.g., such as, changes in hair color, hair length, and/or expressions) based on the matching of one or more attributes of a person in a currently displayed representation with one or more known attributes and/or previously identified attributes for a person.

As illustrated in FIGS. 6B and 6B1, audible description 660*b* is different from audible description 660*b*1. For example, audible description 660*b* contains less details concerning people 640, 642, and 644 than audible description 660*b*1. Although media representation 630 and media representation 631 represent the same media item, audible description 660*b* and audible description 660*b*1 are different because media representation 630 is different from media representation 631. Thus, audible description 660*b* contains less details concerning people 640, 642, and 644 (e.g., "brown eyes," "white t-shirt", "walking", and/or "standing still" in audible description 660*b*1) than audible description 660*b*1 because people 640, 642, and 644 are smaller, take up less area, and/or are less of the focus in media representation 630 when compared to media representation to how people 640, 642, and 644 are displayed in media representation 631. Therefore, the audible description output by computer system 600 in response to an input (e.g., movement input 650*a* and/or movement input 650*a*1) is at least based on the displayed representation of a media item. Accordingly, in some embodiments, computer system 600 outputs two different audible descriptions when two different representations for the same media item are displayed. In some embodiments, computer system 600 generates the audible description that is output on demand (e.g., before detecting the input and/or after the representation of the media item is displayed in which the audible description is generated). In some embodiments, computer system 600 (and/or one or more other computer system in communication with computer system 600) generates on demand in response to one or more request to change a media representation, such as a request to zoom the media representation and/or a request to pan the media representation.

As illustrated in FIGS. 6B and 6B1, like audible description 660*b*, audible description 660*b*1 also includes information concerning the media item as a whole (e.g., "at a museum") and information about a portion of the media item (e.g., "The person on the left is walking away from John, and the person on the right is standing still."). Computer system 600 generates audible description 660*b*1 to include information concerning the media item as a whole based on portions of the media that are not displayed as a part of media representation 631 (e.g., using the full context of the media item), such as sign 632 ("museum"). In some embodiments, computer system 600 generates the information concerning the media item as a whole (and/or information concerning a portion of the media item) using information that is not displayed as being a part of media representation 631, such as metadata (e.g., an image title and/or description). In some embodiments, audible description 660*b*1 does not contain information concerning the media item as whole, such information concerning the location at which the media item was taken. In some embodiments, audible description 660*b* contains more information concerning the location (e.g., "at the museum" in audible description 660*b*) at which the photo was taken while audible description 660*b*1 does not because media representation 630 includes sign 632 ("museum") while media representation 631 does not. In some embodiments, computer system 600 outputs an audible description via one or more speakers of computer system 600 (e.g., and/or one or more speakers that are in communication with computer system 600). At FIG. 6B, computer system 600 detects movement input 650*b*, and at FIG. 6B1, computer system 600 detects movement input 650*b*1.

At FIG. 6C, in response to detecting movement input 650*b*, computer system 600 determines that movement input 650*b* is directed toward a portion of media representation 630 (e.g., a next portion of the media representation) that includes person 640. At FIG. 6C1, in response to detecting movement input 650*b*1, computer system 600 determines that movement input 650*b*1 is directed toward a portion of media representation 631 (e.g., a next portion of the media representation) that includes person 640. The portion that includes person 640 of media representation 630 corresponds to (e.g., represents and/or is the same portion of media as) the portion that includes person 640 of media representation 631. In some embodiments, computer system 600 makes the determination that movement input 650*b* (or movement input 650*b*1) is directed toward a portion of the media representation that includes person 640 because computer system 600 has not provided an audible description for the portion of the media representation that includes person 640 and/or has determined that the portion of the media representation is the next in a queue (of other portions (e.g., portions that include one or more of person 642 and/or 644) of the media representation) for which an audible description can be provided. In some embodiments, computer system 600 makes a determination concerning the next portion of the media representation differently. In some embodiments, computer system 600 determines that the next portion of media representation 630 (e.g., in response to detecting movement input 650*b*) includes one or more subjects (e.g., objects, people, text) that a determined next portion of media representation 631 (e.g., in response to detecting movement input 650*b*1) does not include (or vice-versa).

As illustrated in FIG. 6C, in response to movement input 650*b*, computer system 600 outputs audible description 660*c* ("The person on the left has long hair and is walking in the museum.") and displays bounding box 670*c* around person 640 (e.g., the person on the left). As illustrated in FIG. 6C1, in response to movement input 650*b*1, computer system 600 outputs audible description 660c1 ("The person on the left has long, curly hair. This person is wearing a tank top and is walking. The person on the left has their back turned to the other people. The person on the left appears to be walking away from John and the person to the right of John.") and displays bounding box 670c1 around person 640. Bounding box 670c and bounding box 670c1 are displayed to identify the portion of the media representation that audible description 660c and audible description 660c1, respectively, concern. Although the portion that includes person 640 of media representation 630 corresponds to the portion that includes person 640 of media representation 631, audible description 660c is different from audible description 660c1. For example, audible description 660c contains less details concerning person 640 than audible description 660c1 (e.g., for similar reasons as discussed above concerning audible description 660b containing less details than audible description 660b1 in FIGS. 6B and 6B1).

Notably, audible description 660c is also different from audible description 660b. Audible description 660c is different from audible description 660b of FIG. 6B because audible description 660c is more directed to a particular portion of media representation 630 (e.g., describes more attributes of person 640) while audible description 660b of FIG. 6B was more directed to media representation 630 as a whole. Likewise, audible description 660c1 is different from audible description 660b1 of FIG. 6B1 because audible description 660c1 is more directed to a particular portion of media representation 631 (e.g., describes more attributes of person 640) while audible description 660b1 of FIG. 6B1 was more directed to media representation 630 as a whole. Thus, in some embodiments, computer system 600 provides different levels of details concerning a portion of a media representation based on whether computer system 600 is outputting an audio description for the portion of a media representation, for another portion of the media representation, and/or for the media representation as a whole. In some embodiments, computer system 600, outputs audible description 660c and/or 660c1 in response to detecting an input, such as a tap gesture, on the portion of the respective media representation that includes person 640. At FIG. 6C, computer system 600 detects movement input 650c, and at FIG. 6C1, computer system 600 detects movement input 650c1.

At FIG. 6D, in response to detecting movement input 650c, computer system 600 determines that movement input 650c is directed toward a portion of media representation 630 (e.g., a next portion of the media representation) that includes person 642 (e.g., using one or more similar techniques discussed above in relation to FIG. 6C). At FIG. 6D1, in response to detecting movement input 650c1, computer system 600 determines that movement input 650c1 is directed toward a portion of media representation 631 (e.g., a next portion of the media representation) that includes person 642 (e.g., using one or more similar techniques discussed above in relation to FIG. 6C).

As illustrated in FIG. 6D, in response to movement input 650c, computer system 600 outputs audible description 660d ("At the museum, John is standing in the middle of the two shorter people. John is wearing a white shirt with Jeans and is smiling.") and displays bounding box 670d around person 642 (e.g., "John," the person in the middle). As illustrated in FIG. 6D1, in response to movement input 650c1, computer system 600 outputs audible description 660d1 ("John has brown eyes and is wearing a white t-shirt, fitted jeans, and white sneakers. John is smiling, but he doesn't appear to be smiling as much as the person to the right of John") and displays bounding box 670d1 around person 642 (e.g., "John"). Although the portion that includes person 642 of media representation 630 corresponds to the portion that includes person 642 of media representation 631, audible description 660d is different from audible description 660d1, For example, audible description 660d contains less details concerning person 642 than audible description 660d1 for similar reasons as discussed above concerning (audible description 660b containing less details than audible description 660b1 in FIGS. 6B and 6B1). Notably, audible description 660d is different from audible description 660c of FIG. 6C, and audible description 660d1 is different from audible description 660c1 because each respective audible description is generated based on a different portion of the displayed media representation (e.g., for similar reasons as discussed above concerning audible description 660b containing less details than audible description 660b1 in FIGS. 6B and 6B1). At FIG. 6D, computer system 600 detects movement input 650c (e.g., continues to detect) at a location for a predetermined period of time (e.g., 1-5 seconds), and at FIG. 6D1, computer system 600 detects (e.g., continues to detect) movement input 650c1 at a location for the predetermined period of time.

As illustrated in FIG. 6E, in response detecting movement input 650c at the location for a predetermined period of time, computer system 600 continues to display bounding box 670d around person 642 (e.g., "John") and outputs audible description 660e ("This portion of the photo is to the right of the middle of the photo. A previous portion [(and/or a portion on the left)] includes a person who has curly hair and is walking. A next portion [(and/or a portion on the right)] includes a person who is wearing a dress"). Audible description 660e is a description that includes an indication of where the portion that includes person 642 is located (e.g., "this portion of the photo is to the right of the middle portion of the photo") and a description of one or more other portions of the media representation 630 that are adjacent to the portion of media representation 630 that includes person 642 (e.g., "a previous portion" and/or "a next portion"). Thus, in response to detecting a movement input (or continuing to detecting an input) at a location for a predetermined period of time, computer system 600 outputs an audible description that includes one or more of a description of where a portion is located and/or one or more other portions of a media representation that are near and/or adjacent to the portion (e.g., the portion of the media representation for which computer system 600 outputs the audible description, started to output an audible description in response to detecting an initial portion of the movement input (e.g., a portion of the input detected before the predetermined period of time), the portion for which computer system 600 was outputting an audible description for before the movement input was detected at the location for the predetermination period of time, and/or a portion that corresponds to the location where the movement input was detected for the predetermined period of time).

As illustrated in FIG. 6E1, in response detecting movement input 650c1 at the location for a predetermined period of time, computer system 600 continues to display bounding box 670d1 around person 642 (e.g., "John") and outputs audible description 660e1 ("This portion is in the middle of the photo. A previous portion of the photo includes a person who has curly hair. A next portion of the photo includes a person who is wearing fancier clothes than John and smiling."). At FIG. 6E1, computer system 600 continues to display bounding box 670d1 around person 642 and outputs audible description 660e1 for similar reasons as discussed above in relation to bounding box 670*d*1 and audible description 660*e*1 of FIG. 6E. Notably, audible description 660*e*1 of FIG. 6E1 includes more details than audible description 660*e* (e.g., for similar reasons as discussed above concerning audible description 660*b* containing less details than audible description 660*b*1 in FIGS. 6B and 6B1). At FIG. 6E, computer system 600 detects drag input 650*e* across bounding box 670*d* and, at FIG. 6E1, computer system 600 detects drag input 650*e*1 across bounding box 670*d*1.

At FIG. 6F, in response to detecting drag input 650*e* across bounding box 670*d*, computer system 600 outputs audible description 660*f* ("At the museum, the person on the right [(e.g., person 644)] is smiling and wearing a dress.") and displays bounding box 670*f* around person 644 (e.g., the person on the right). As illustrated in FIG. 6F1, in response to drag input 650*e*1 across bounding box 670*d*1, computer system 600 outputs audible description 660*f*1 ("The person to the right of John is smiling and has freckles. This person is wearing a dress that has a flower on it. The flower is located near the bottom of the dress.") and displays bounding box 670*f*1 around person 644. Audible description 660*f* and audible description 660*f*1 are different (e.g., for similar reasons as described above in relation to FIGS. 6C and 6C1). In some embodiments, computer system 600 outputs an audible description (e.g., such as audible description 660*c* and/or 660*c*1) before detecting drag input 650*e* (and/or drag input 650*e*1) and/or while drag input 650*e* (and/or drag input 650*e*1) is within at location within bounding box 670*d* (and/or bounding box 670*d*1) of FIG. 6D (or FIG. 6D1). In some embodiments, computer system 600 outputs audible description 660*f* and/or audible description 660*f*1 after a determination is made (and/or in response to a determination) that respective input (e.g., drag input 650*e* and/or drag input 650*e*1) is within a predetermined distance away from the edge (e.g., right edge) of bounding box 670*d* (and/or bounding box 670*d*1) that is closest to person 644 in FIG. 6D (and/or FIG. 6D1). In some embodiments, computer system 600 ceases outputting an audible description to output audible description 660*f* based on the position (e.g., position with respect to person 642 and person 644) drag input 650*e*. In some embodiments, looking back at FIGS. 6A-6F1, computer system 600 has a system language that is set to a particular language (e.g., English). In some embodiments, while computer system 600 is set to the particular language, computer system 600 outputs audible descriptions 660*b*-660*f* and/or 660*b*1-660*f*1 in the particular language. In some embodiments, while computer system 600 is set to another language (e.g., Spanish) that is different from the particular language, computer system 600 outputs audible descriptions 660*b*-660*f* and/or 660*b*1-660*f*1 in the other language (e.g., without outputting the audible descriptions in another language). In some embodiments, computer system 600 outputs an audible descriptions in one language and, in response to detecting a change in the system language setting to another language, computer system 600 outputs future audible descriptions in the other language.

Figure 6H:
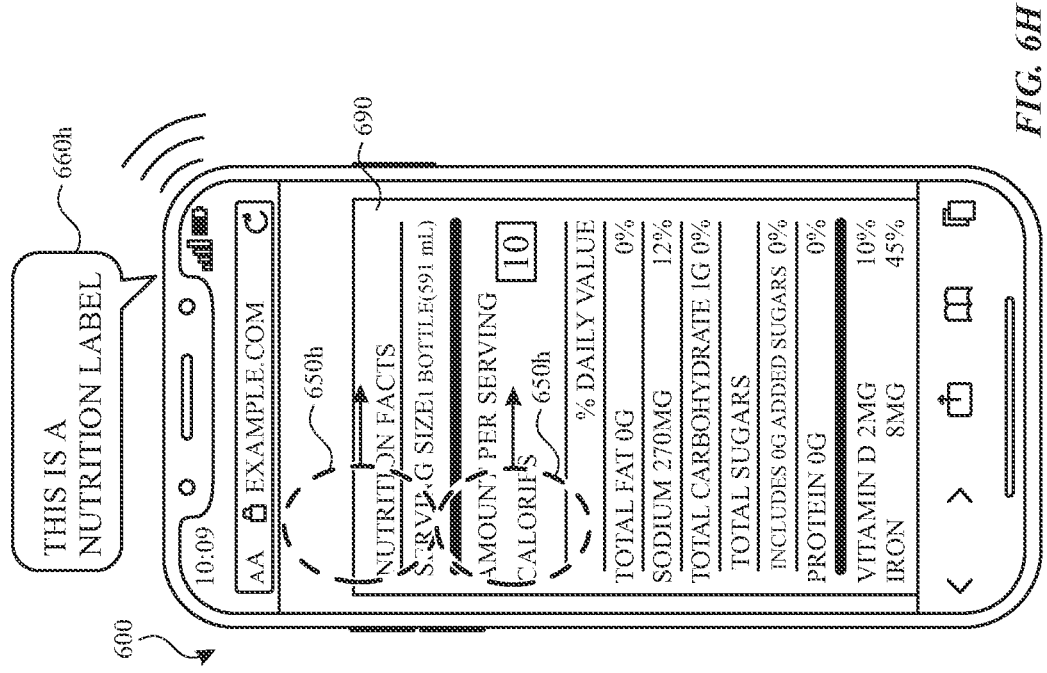
Figure 6G:
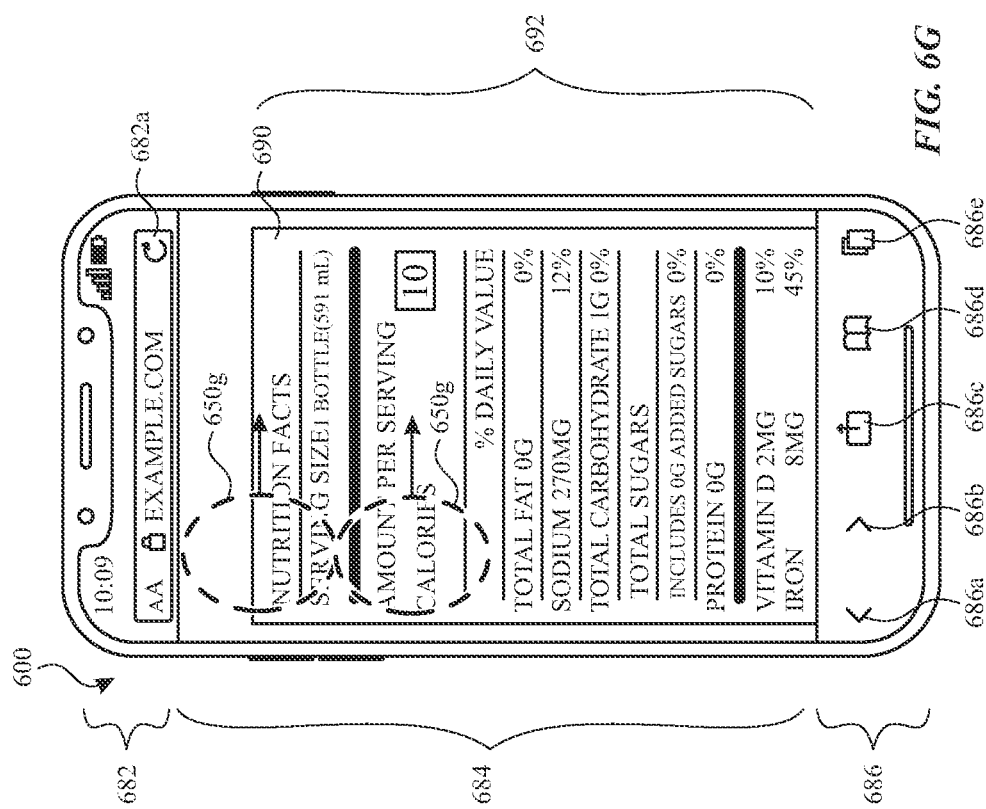

FIGS. 6G-6M illustrate an exemplary scenario that is used to describe exemplary user interfaces for managing audible descriptions for visual media. In particular, the scenario illustrated in FIGS. 6G-6M is provided at least to show that computer system 600 can output audible descriptions for different media that is displayed and/or in a user interface for a different application. FIG. 6G illustrates computer system 600 displaying a web browser user interface that includes browser control region 682, browser display region 684, and browser control region 686. Browser control region 682 includes address field 682*a*, where a web address for a website can be entered so that computer system 600 can navigate to the website. In FIG. 6G, computer system 600 is currently displaying media representation 690 that is on a webpage that has a web address that includes "example-.com" (e.g., as indicated in address field 682*a*) in browser display region 684. Computer system 600 displays browser control region 686 below browser display region 684. Browser control region 686 includes one or more controls for interacting with the web browser application that corresponds to the web browser user interface. Browser control region 686 includes back control 686*a* (e.g., where, in response to detecting selection of back control 686*a*, computer system 600 displays a webpage for a previously visited web address in a first direction in a queue of recently visited web addresses), forward control 686*b* (e.g., where, in response to detecting a selection of forward control 686*b*, computer system 600 displays a webpage for a previously visited web address in a second direction in a queue of recently visited web addresses), share control 686*c* (e.g., where, in response to detecting a selection of share control 686*c*, computer system 600 initiates a process for sharing a web address (e.g., a currently displayed web address and/or one or more media items associated with the web address) with one or more recipients), history control 686*d* (e.g., where, in response to detecting a selection of history control 686*d*, computer system 600 displays a list of previously visited web addresses), and navigation control 686*e* (e.g., where, in response to detecting a selection of navigation control 686*e*, computer system 600 displays one or more objects for navigating to different previously displayed webpages).

At FIG. 6G, media representation 690 includes text portions 692, which describe a set of nutritional facts for a liquid. Media representation 690 represents a different media item than the media item represented by media representation 630 and media representation 631 of FIGS. 6A-6F1. In particular, media representation 690 is a representation of an image of a nutritional label while media representation 630 and media representation 631 are representations of an image that was taken at a museum. In some embodiments, media representation 690 is a photo that was taken on a nutrition label, a screenshot that was taken of a nutritional label, and/or an image of a nutritional label that was generated by a computer. In some embodiments, media representation 690 is a representation of video media. Thus, in some embodiments, computer system 600 is not limited by a type of media and/or how the media was captured when outputting audible descriptions for a representation of a respective media item. In some embodiments, computer system 600 outputs audible descriptions using one or more similar techniques as discussed above in relation to FIGS. 6A-6F1. At FIG. 6G, computer system 600 detects movement input 650*g* on media representation 690.

As illustrated in FIG. 6H, in response to detecting movement input 650*g*, computer system 600 outputs audible description 660*h*. Audible description 660*h* includes words ("this is a nutritional label") that describe media representation 690 as a whole. In some embodiments, computer system 600 generates the words included in audible description 660*h* based on the context (e.g., other words or objects) of media representation 690. In some embodiments, the context (e.g, that the media representation is a nutritional label) of media representation 690 is determined by one or more words in text portions 692. In some embodiments, computer system 600 determines the context of media representation 690 by comparing text portion 692 and/or media representation 690 to know media representations and/or text portions. In some embodiments, computer system 600 generates the words included in audible description 660*h* using information that is not displayed as being a part of media representation 660*h*, such as metadata (e.g., an image title and/or description), information stored on computer system 600 (e.g., browser history), other information obtained from the web address (e.g., example.com). In some embodiments, audible description 660*h* can include other words (e.g., like those described above in relation to FIGS. 6A and 6A1) that description one or more portions of audible description 660*h*. At FIG. 6H, computer system 600 detects movement input 650*h* on media representation 690.

As illustrated in FIG. 6I, in response to detecting movement input 650*h*, computer system 600 outputs audible description 660*i* and displays bounding box 670*i* around text portion 692*a* ("nutrition facts"). Audible description 660*i* includes the words ("nutrition facts") that are included in text portion 692*a*. At FIG. 6I, computer system 600 detects movement input 650*i* on media representation 690.

As illustrated in FIG. 6J, in response to detecting movement input 650*i*, computer system 600 outputs audible description 660*j* and displays bounding box 670*j* around text portion 692*b* ("Serving size 1 bottle (591 mL)"). Audible description 660*i* includes the words ("serving size, one bottle, five hundred ninety-one milliliters") that are surrounded by bounding box 670*i* (e.g., includes the words in text portion 692*b*). At FIG. 6J, computer system 600 detects movement input 650*j* on media representation 690.

As illustrated in FIG. 6K, in response to detecting movement input 650*j*, computer system 600 outputs audible description 660*k* and displays bounding box 670*k* around text portion 692*c* ("Amount per serving Calories 10"). Audible description 660*i* includes the words ("amount per serving calories ten") that are surrounded by bounding box 670*i* (e.g., includes the words in text portion 692*b*). At FIG. 6K, computer system 600 detects a portion of movement input 650*k* over "amount" in text portion 692*c*. In some embodiments, movement input 650*k* is a different type (e.g., single finger movement input vs. a multi-finger movement input) of movement input than movement inputs 650*g*-650*j*.

Figure 6M:
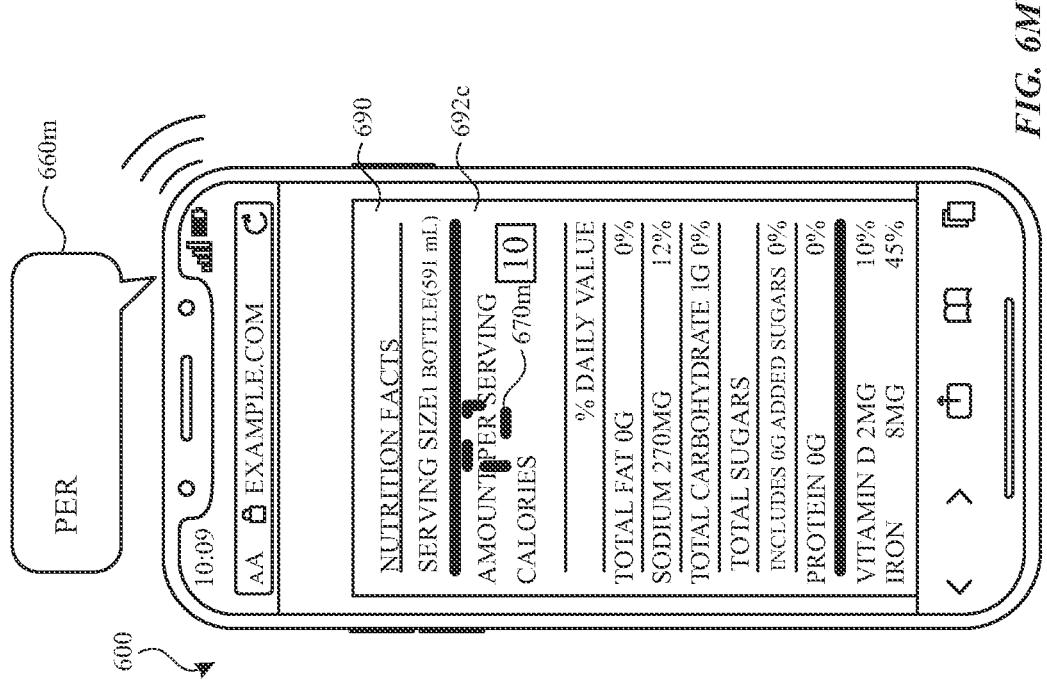
Figure 7A:
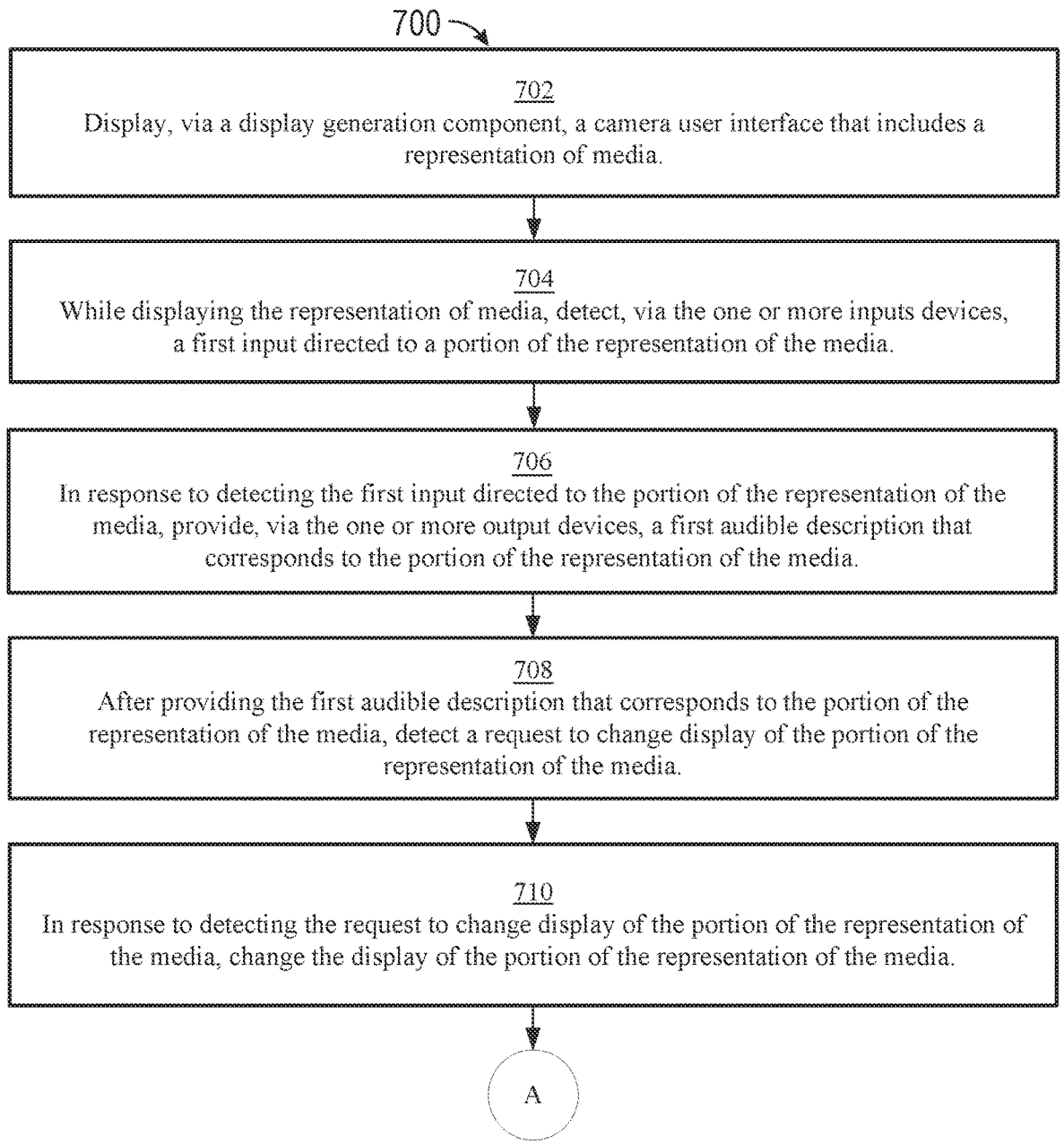
FIGS. 7A-7B are a flow diagram illustrating methods for managing audible descriptions for visual media in accordance with some embodiments.
Figure 7B:
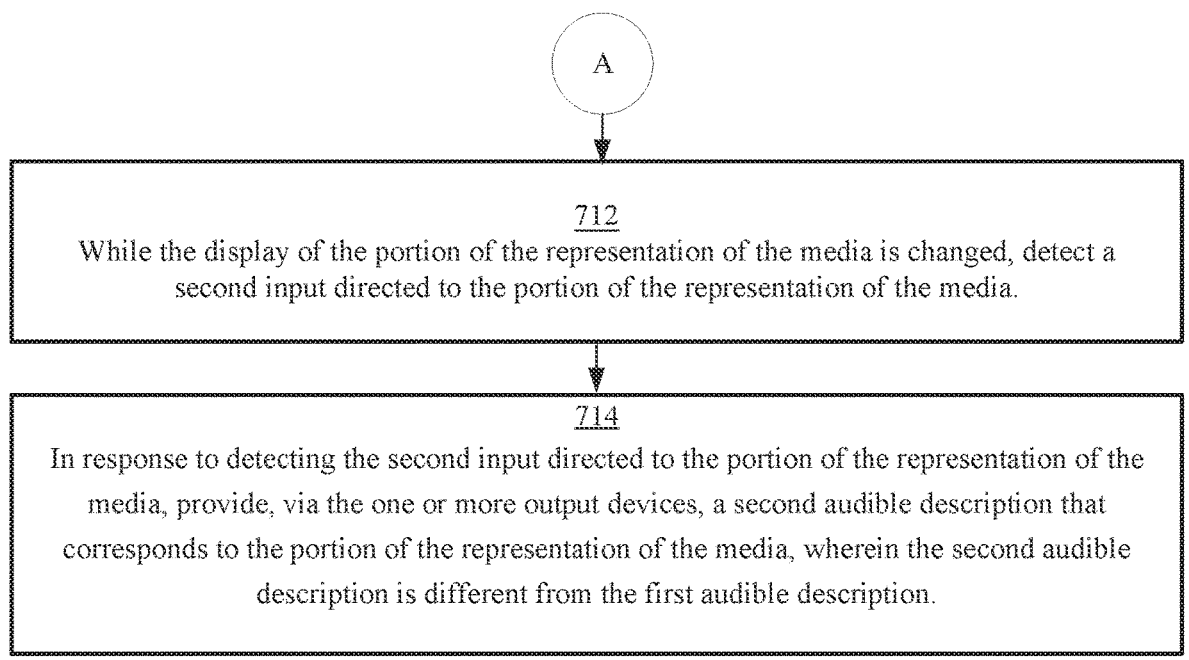

As illustrated in FIG. 6L, in response to detecting a portion of movement input 650*k* at FIG. 6K, computer system 600 outputs audible description 660*l*, which is an audible description of the word (e.g., "amount") in text portion 692*c* that the portion of movement input 650*k* was detected over in FIG. 6K. As illustrated in FIG. 6L, in response to detecting a portion of movement input 650*k* at FIG. 6K, computer system 600 displays bounding box 670*l* surrounding "amount" to denote that computer system 600 is providing an audible description for the word. In addition, because computer system 600 is providing an audio description for a subset of text portion 670*c*, computer system 600 displays bounding box 670*l* around the subset ("amount") instead of around other subsets of text portion 670*c*. At FIG. 6L, computer system 600 detects another portion of movement input 650*k* over "per" in text portion 692*c*. As illustrated in FIG. 6M, in response to detecting a portion of movement input 650*k* at FIG. 6L, computer system 600 outputs audible description 660*m*, which is an audible description of the word (e.g., "per") in text portion 692*c* that the portion of movement input 650*k* was detected over in FIG. 6L. In some embodiments, the portion of movement input 650*k* detected in FIG. 6K and the portion of movement input 650*k* detected in FIG. 6L are different inputs (e.g., inputs that are not continuously detected on computer system 600). In some embodiments, computer system 600 outputs audible descriptions 660*l* and 660*m* in sequence and with a speed that is based on the speed of movement input 650*k* and/or the times that movement input 650*k* is directed to (e.g., in sequence) portions of the display that correspond to "amount" and "per" in text portion 670*c*. In some embodiments, in response to detecting one or more additional portions of movement input 650*k*, computer system 600 outputs audible descriptions of the text in media representation 690. In some embodiments, computer system 600 outputs one or more audible descriptions of a certain type (e.g., text, tables, people, and/or objects) and does not output one or more audible descriptions of a different type (e.g., text, tables, people, and/or objects) based on one or more settings of computer system 600. For example, when a setting to output audible descriptions of text is on and a setting to output audible descriptions of objects is off, computer system 600 will output audible descriptions concerning text in a respective representation of media (e.g., that includes text and objects) and will not output audible descriptions concerning objects in the representation of media in response to detecting receiving one or more inputs (e.g., movement input, tap input, and/or voice input). In some embodiments, computer system 600 outputs audible descriptions in response to detecting one or more inputs (e.g., as discussed above in relation to FIGS. 6A-6M) while the computer system 600 is configured to be in an accessibility mode (e.g., a voice mode). In some embodiments, computer system 600 does not output audible descriptions in response to detecting the one or more inputs (e.g., as discussed above in relation to FIGS. 6A-6M) while computer system 600 is not configured to be in the accessibility mode. In some embodiments, computer system 600 performs different operations in response to detecting one or more inputs (e.g., discussed above in relation to FIGS. 6A-6M) while computer system 600 is not configured to be in the accessibility mode than the operations discussed above in relation to FIGS. 6A-6M (e.g., that are performed while computer system 600 is operating in the accessibility mode).

FIGS. 7A-7B are a flow diagram illustrating a method for (700) using a computer system in accordance with some embodiments. Method (700) is performed at a computer system (e.g., a smartphone, a desktop computer, a laptop, a tablet) that is in communication with a display generation component (e.g., a display controller, a touch-sensitive display system), one or more input devices (e.g., a touch-sensitive surface, one or more cameras), and one or more output devices (e.g., one or more speakers). Some operations in method 700 are, optionally, combined, the orders of some operations are, optionally, changed, and some operations are, optionally, omitted.

As described below, method 700 provides an intuitive way for managing audible descriptions for visual media. The method reduces the cognitive burden on a user for managing audible descriptions for visual media, thereby creating a more efficient human-machine interface. For battery-operated computing devices, enabling a user to managing audible descriptions for visual media faster and more efficiently conserves power and increases the time between battery charges.

The computer system (e.g., 600) displays (702), via a display generation component, a camera user interface that includes a representation (e.g., 630, 631, or 690) (e.g., a representation over-time, a live preview feed of data from a camera, a previously captured representation of media (e.g., a representation of media retrieved from a website, from storage, from an application)) of media (e.g., a photo, a video (e.g., a frame of a video)).

While displaying the representation of the media, the computer system (e.g., 600) detects (704), via the one or more inputs devices, a first input (e.g., 650*a*, 650*b*, 650*c*, 650*e*, 650*g*, 650*h*, 650*i*, 650*j*, 650*k*, or 650*l*) directed to (e.g., to interact with) a portion (e.g., portion of representation 630 that includes 640, 642, or 644) (e.g., portion of representation 631 that includes 640, 642, or 644) (e.g., 692) of the representation (e.g., 630, 631, or 690) of the media (e.g., a tap input/gesture (e.g., a single tap input, a multi-tap input) and/or, in some embodiments, detecting a non-tap input/ gesture (e.g., a press-and-hold input, a swipe input (e.g., a single finger swipe input, a multi-finger swipe input), a drag input/gesture). In some embodiments, the portion of the representation of the media includes visual information (e.g., objects, text, people, faces). In some embodiments, the first input is an input that is a part of a "next" gesture where the input is directed to the portion by the portion being (e.g., being identified via the computer system as) the next portion of the representation (e.g., in a sequence of portions of the representation) when the input is received (e.g., where the input is a certain type of input). In some embodiments, the first input is not detected at a location that corresponds to the portion of the representation of the media.

in response to detecting the first input (e.g., 650*a*, 650*b*, 650*c*, 650*e*, 650*g*, 650*h*, 650*i*, 650*j*, 650*k*, or 650*l*) directed to the portion e.g., portion of representation 630 that includes 640, 642, or 644) (e.g., portion of representation 631 that includes 640, 642, or 644) (e.g., 692) of the representation (e.g., 630, 631, or 690) of the media, the computer system provides (706) (e.g., outputting, issuing), via the one or more output devices, a first audible description (e.g., 660*b*, 660*c*, 660*e*1, 660*e*, 660*f*, 660*g*, 660*h*, 660*l*, or 660*m*) that corresponds to the portion of the representation of the media (e.g., without providing an audible description that corresponds to a second portion of the representation of the media). In some embodiments, the first audible description is generated (e.g., via one or more machine learning processes) by a computer system (e.g., the computer system, an external computer system). In some embodiments, the first audible description includes a first description about the visual information in the portion of the representation of the media.

After providing the first audible description (e.g., 660*b*, 660*c*, 660*d*, 660*e*, 660*f*, 660*g*, 660*h*, 660*l*, or 660*m*) that corresponds to the portion (e.g., portion of representation 630 that includes 640, 642, or 644) (e.g., portion of representation 631 that includes 640, 642, or 644) (e.g., 692) of the representation of the media, the computer system (e.g., 600) detects (708) a request to change display of the portion of the representation of the media (e.g., as described above in relation to FIGS. 6A, 6A1, 6B, and/or 6B1) (e.g., a request to change display of the representation of the media). In some embodiments, as a part of detecting the request to change display of the portion of the representation of the media, the computer system detects a request to zoom (e.g., zoom in on/zoom out of) the representation of the media, pan/translate/scroll the representation of the media, and/or display a second representation of the media (e.g., a cropped representation of the media) that includes the portion of the representation of the media.

In response to detecting the request to change display of the portion of the representation of the media (e.g., as described above in relation to FIGS. 6A, 6A1, 6B, and/or 6B1), the computer system (e.g., 600) changes (710) the display of the portion (e.g., portion of representation 630 that includes 640, 642, or 644) (e.g., portion of representation 631 that includes 640, 642, or 644) (e.g., 692) of the representation (e.g., 630, 631, or 690) of the representation of the media. In some embodiments, as a part of changing the display of the portion of the representation of the media, the computer system zooms (e.g., zoom in on/zoom out of) the representation of the media, pans/translates/scrolls the representation of the media, and/or displays a second representation of the media (e.g., a cropped representation of the media) that includes the portion of the representation of the media.

While the display of the portion (e.g., portion of representation 630 that includes 640, 642, or 644) (e.g., portion of representation 631 that includes 640, 642, or 644) (e.g., 692) of the representation (e.g., 630, 631, or 690) of the representation of the media is changed (and while continuing to display the portion of the representation of the media), the computer system (e.g., 600) detects (712) a second input (e.g., 650*a*1, 650*b*1, 650*c*1, or 650*e*1) directed to the portion (e.g., portion of representation 630 that includes 640, 642, or 644) (e.g., portion of representation 631 that includes 640, 642, or 644) of the representation of the media (e.g., a tap input/gesture (e.g., a single tap input, a multi-tap input (e.g., a double tap input, a triple tap input)) and/or, in some embodiments, detecting a non-tap input/gesture (e.g., a press-and-hold input, a swipe input (e.g., a single finger swipe input, a multi-finger swipe input), a drag input/ gesture)). In some embodiments, the second input is an input that is a part of a "next" gesture where the input is directed to the portion by the portion being (e.g., being identified via the computer system as) the next portion of the representation (e.g., in a sequence of portions of the representation) when the input is received. In some embodiments, the second input is not detected at a location that corresponds to the portion of the representation of the media.

In response to detecting the second input (e.g., 650*a*1, 650*b*1, 650*c*1, or 650*e*1) directed to the portion (e.g., portion of representation 630 that includes 640, 642, or 644) (e.g., portion of representation 631 that includes 640, 642, or 644) (e.g., 692) of the representation (e.g., 630, 631, or 690) of the representation of the media, the computer system (e.g., 600) provides (714) (e.g., outputting, issuing), via the one or more output devices, a second audible description (e.g., 660*b*1, 660*c*1, 660*d*1, 660*e*1, 660*f*1, 660*g*, 660*h*, 660*l*, 660*m*) (e.g., that corresponds to the portion of the representation of the media, where the second audible description (e.g., 660*b*1, 660*c*1, 660*d*1, 660*e*1, 660*f*1, 660*g*, 660*h*, 660*l*, 660*m*) is different from the first audible description (e.g., 660*b*, 660*c*, 660*d*, 660*e*, 660*f*, 660*g*, 660*h*, 660*l*, 660*m*) (e.g., without providing an audible description that corresponds to the second portion of the representation of the media). In some embodiments, the second audible description is generated (e.g., via one or more machine learning processes) by a computer system (e.g., the computer system, an external computer system). In some embodiments, the second audible description includes a second description about the visual information in the portion of the representation of the media. In some embodiments, the second description about the visual information in the representation of the media is different from the first description about the visual information in the representation of the media. Providing a second audible description that corresponds to the portion of the representation of the media while the display of portion of the representation of the media is changed, where the second audible description is different from the first audible description that corresponds to the portion of the representation of the media that was provided before the portion of the representation of the media was changed, provides feedback to the user concerning an audible description that is based on the current portion of the representation of the media that is displayed and, in particular, provides feedback for users who have vision accessibility needs (e.g., a user who have limited vision, is colorblind, and/or is blind) to be able to obtain audible descriptions that are relevant to a currently displayed representation of the media, which improves feedback.

In some embodiments, the second audible description (e.g., 660b1, 660c1, 660d1, 660e1, 660f1, 660g, 660h, 660l, or 660m) 660b1, 660c1, 660d1, 660e1, 660f1, 660g, 660h, 660l, or 660m) includes a description about the representation of the media as a whole that is provided (e.g., output) before a description about the portion of the representation of the media.

In some embodiments, the portion e.g., portion of representation 630 that includes 640, 642, or 644) (e.g., portion of representation 631 that includes 640, 642, or 644) of the representation is displayed at a first zoom level. In some embodiments, after providing, via the one or more output devices, the second audible description (e.g., 660b1, 660c1, 660d1, 660e1, 660f1, 660g, 660h, 660l, or 660m) that corresponds to the portion of the representation of the media, the computer system detects a request to zoom the representation of the media (e.g., as described above in relation to FIGS. 6A, 6A1, 6B, and/or 6B1). In some embodiments, in response to detecting the request to zoom the representation of the media (e.g., the request to zoom the representation of the media is detected in response to detecting an input directed to the media (e.g., an input that is a different type (e.g., different types of inputs, such as a tap input, a swipe input, a drag input, a rotational input, multi-tap input, a multi-finger tap input, and/or a press-and-hold input) than the first input directed to a portion of the representation of the media and second first input directed to a portion of the representation of the media), the computer system (e.g., 600) displays the representation of the media displayed at a second zoom level that is different from the first zoom level. In some embodiments, while displaying the representation of the media displayed at the second zoom level (e.g., and the portion of the representation of the media is displayed at the second zoom level) (e.g., as described above in relation to FIGS. 6A, 6A1, 6B, and/or 6B1), the computer system detects a third input (e.g., 650a1, 650b1, 650c1, or 650e1) directed to the portion of the representation (e.g., a tap input/gesture (e.g., a single tap input, a multi-tap input) and/or, in some embodiments, detecting a non-tap input/gesture (e.g., a press-and-hold input, a swipe input (e.g., a single finger swipe input, a multi-finger swipe input), a drag input). In some embodiments, the third input is an input that is a part of a "next" gesture where the input is directed to the portion by the portion being (e.g., being identified via the computer system as) the next portion of the representation (e.g., in a sequence of portions of the representation) when the input is received (e.g., where the input is a certain type of input). In some embodiments, the third input is not detected at a location that corresponds to the portion of the representation of the media. In some embodiments, in response to detecting the third input directed to the portion of the representation of the media, the computer system provides, via the one or more output devices, a third audible description (e.g., 660b1, 660c1, 660d1, 660e1, 660f1, 660g, 660h, 660l, or 660m) that corresponds to the portion of the representation of the media. In some embodiments, the third audible description is different from the first audible description (e.g., 660b, 660c, 660d, 660e, 660f, 660g, 660h, 660l, or 660m) and the second audible description (e.g., 660b1, 660c1, 660d1, 660e1, 660f1, 660g, 660h, 660l, or 660m). Providing, via the one or more output devices, a third audible description in response to detecting an input while displaying the portion of the representation of the media displayed at the second zoom level, where the third audible description is different from the first audible description and the second audible description (e.g., that were provided when the representation of the media was displayed at a different zoom level), provides feedback to the user concerning an audible description that is based on the current portion of the representation of the media that is displayed and, in particular, provides feedback for users who have vision accessibility needs (e.g., a user who have limited vision, is colorblind, and/or is blind) to be able to obtain audible descriptions that are relevant to a currently displayed portion of the representation of the media, which improves feedback.

In some embodiments, after providing, via the one or more output devices, the second audible description (e.g., 660b1, 660c1, 660d1, 660e1, 660f1, 660g, 660h, 660l, or 660m) that corresponds to the portion (e.g., portion of representation 630 that includes 640, 642, or 644) (e.g., portion of representation 631 that includes 640, 642, or 644) of the representation of the media, the computer system (e.g., 600) detects a request to scroll the representation of the media (e.g., the request to scroll the representation of the media is detected in response to detecting an input directed to the media (e.g., an input that is a different type (e.g., different types of inputs, such as a tap input, a swipe input, a drag input, a rotational input, multi-tap input, a multi-finger tap input, and/or a press-and-hold input) of input than the first input directed to a portion of the representation of the media, second first input directed to a portion of the representation of the media, and/or an input to zoom the representation of media). In some embodiments, in response to detecting the request to scroll the representation of the media, the computer system scrolls the representation of the media (e.g., in a direction of an input) (e.g., as discussed above in relation to FIGS. 6A, 6A1, 6B, 6B1). In some embodiments, while the representation of the media is scrolled (e.g., and the portion of the representation of the media is displayed), the computer system detects a fourth input (e.g., 650a1, 650b1, 650c1, or 650e1) (e.g., 650a, 650b, 650c, 650e, 650g, 650h, 650i, 650j, 650k, or 650l) directed to the portion of the representation (e.g., a tap input/gesture (e.g., a single tap input, a multi-tap input) and/or, in some embodiments, detecting a non-tap input/gesture (e.g., a press-and-hold input, a swipe input (e.g., a single finger swipe input, a multi-finger swipe input), a drag input). In some embodiments, the fourth input is an input that is a part of a "next" gesture where the input is directed to the portion by the portion being (e.g., being identified via the computer system as) the next portion of the representation (e.g., in a sequence of portions of the representation) when the input is received (e.g., where the input is a certain type of input). In some embodiments, the fourth input is not detected at a location that corresponds to the portion of the representation of the media. In some embodiments, in response to detecting the fourth input directed to the portion of the representation of the media, the computer system provides, via the one or more output devices, a fourth audible description that corresponds to the portion of the representation of the media. In some embodiments, the fourth audible description (e.g., 660b1, 660c1, 660d1, 660e1, 660f1, 660g, 660h, 660l, or 660m) is different from the first audible description (e.g., 660b, 660c, 660d, 660e, 660f, 660g, 660h, 660l, or 660m) and the second audible description (e.g., 660b1, 660c1, 660d1, 660e1, 660f1, 660g, 660h, 660l, or 660m) (e.g., and the fourth audible description). Providing, via the one or more output devices, a fourth audible description that corresponds to the portion of the representation of the media in response to detecting an input while the representation is scrolled, where the fourth audible description is different from the first audible description and the second audible description (e.g., that were provided when the representation of the media was scrolled differently), provides feedback to the user concerning an audible description that is based on the current portion of the representation of the media that is displayed and, in particular, provides feedback for users who have vision accessibility needs (e.g., a user who have limited vision, is colorblind, and/or is blind) to be able to obtain audible descriptions that are relevant to a currently displayed portion of the representation of the media, which improves feedback.

In some embodiments, as a part of providing the second audible description e.g., 660b1, 660c1, 660d1, 660e1, 660f1, 660g, 660h, 660l, or 660m) (and/or the first audible description) includes (e.g., is in at least), the computer system (e.g., 600), in accordance with a determination that a first system language setting is set to a first language, provides the second audible description (and/or the first audible description) in the first language (e.g., without including a second language that is different from the first language) (e.g., as described above in relation to FIGS. 6F and 6F1). In some embodiments, as a part of providing the second audible description (.and/or the first audible description) includes (e.g., is in at least), the computer system, in accordance with a determination that the first system language setting is set to a second language that is different from the first language, provides the second audible description (e.g., 660b1, 660c1, 660d1, 660e 1, 660f1, 660g, 660h, 660l, or 660m) (and/or the first audible description) in the second language (e.g., without including the first language) (e.g., as described above in relation to FIGS. 6F and 6F1). Automatically providing an audible description in a particular language based on a system language setting allows the computer system to automatically provide the second audible description in a language that is determined to be more relevant to the user and, in particular, provides feedback for users who have vision accessibility needs (e.g., a user who have limited vision, is colorblind, and/or is blind) to be able to obtain audible descriptions that are relevant to a currently displayed portion of the representation of the media and are in a language that is relevant to the user, which performs an operation when a set of conditions has been met without requiring further user input and provides improved feedback.

In some embodiments, the second audible description (e.g., 660b 1, 660c1, 660d1, 660e1, 660f1, 660g, 660h, 660l, or 660m) that corresponds to the portion of the representation of the media includes a third language. In some embodiments, after providing, via the one or more output devices, the second audible description (e.g., 660b1, 660c1, 660d1, 660e1, 660f1, 660g, 660h, 660l, or 660m) that corresponds to the portion of the representation of the media, the computer system (e.g., 600) detects a request to change a second system language setting of the computer system. In some embodiments, in response to detecting the request to change the second system language setting of the computer system, the computer system sets the second system language setting from the third language to a fourth language that is different from the first language (e.g., as described above in relation to FIGS. 6F and 6F1) (e.g., as described above in relation to FIGS. 6F and 6F1). In some embodiments, the request to change the second system language setting is detected in response to an input (e.g., a tap input/gesture (e.g., a single tap input, a multi-tap input (e.g., a double tap input, a triple tap input)) and/or, in some embodiments, detecting a non-tap input/gesture (e.g., a press-and-hold input, a swipe input (e.g., a single finger swipe input, a multi-finger swipe input), a drag input)) on a language control. In some embodiments, while the second system language setting is set to the fourth language and while displaying the portion of the representation of the media (e.g., the changed portion of the representation of the media) that was displayed when the second input was detected), the computer system detects a fifth input directed to the portion of the representation of the media (e.g., a tap input/gesture (e.g., a single tap input, a multi-tap input) and/or, in some embodiments, detecting a non-tap input/gesture (e.g., a press-and-hold input, a swipe input (e.g., a single finger swipe input, a multi-finger swipe input), a drag input). In some embodiments, the fourth input is an input that is a part of a "next" gesture where the input is directed to the portion by the portion being (e.g., being identified via the computer system as) the next portion of the representation (e.g., in a sequence of portions of the representation) when the input is received (e.g., where the input is a certain type of input). In some embodiments, the fourth input is not detected at a location that corresponds to the portion of the representation of the media. In some embodiments, in response to detecting the fifth input directed to the portion of the representation of the media, the computer system provides, via the one or more output devices, a fifth audible description that corresponds to the portion of the representation of the media. In some embodiments, the fifth audible description includes the fourth language (e.g., and does not include the third language) (e.g., as described above in relation to FIGS. 6F and 6F1). Providing, via the one or more output devices, a fifth audible description that corresponds to the portion of the representation of the media while the system language is set to the fourth language and while displaying the portion of the representation of the media provides the user with feedback in a language that is determined to be more relevant to the user and, in particular, provides feedback for users who have vision accessibility needs (e.g., a user who have limited vision, is colorblind, and/or is blind) to be able to obtain audible descriptions that are relevant to a currently displayed portion of the representation of the media and are in a language that is relevant to the user, which provides improved feedback.

In some embodiments, the second audible description (e.g., 660b, 660c, 660d, 660e, 660f, 660g, 660h, 660l, or 660m) (and/or the first audible description) includes a description of a face (e.g., face of person 640, 642, or 644), an object (e.g., as described above in relation to FIGS. 6A, 6A1, 6B, or 6B1), and/or text (e.g., 692). In some embodiments, the second audible description (and/or the first audible description) includes an element (e.g., a face, an object, and/or text) that is in the displayed representation of the media (e.g., is in the first portion of the representation of the media).

In some embodiments, the second audible description e.g., 660b, 660c, 660d, 660e, 660f, 660g, 660h, 660l, or 660m) (and/or the first audible description) includes a description of a face (e.g., a name of a person with the face) that is identified based on information (e.g., face of person 640, 642, or 644 about one or more previously identified (e.g., by the computer system) people (e.g., known people) (e.g., information concerning (e.g., from and/or identified in relation to)) people in one or more media items (e.g., photos, videos, etc.), a name and/or face that is associated with (e.g., linked to) contact information (e.g., a phone number and/or e-mail addressed)) (e.g., as described above in relation to FIGS. 6A, 6A1, 6B, or 6B1). In some embodiments, the information about the one or more previously identified people was previously identified by a user tagging (e.g., inputting information, designating a photo with the face of the user as belong to a particular user) concerning the identity of a user. In some embodiments, the information about the one or more previously identified people is associated with and/or linked to contact information, such as a phone number and/or email address that is stored and/or accessible to the computer system. Providing the second audible description that includes a description of a face that is identified based on information about one or more known people provides feedback to the user concerning people that are relevant to the user, and, in particular, provides feedback for users who have vision accessibility needs (e.g., a user who have limited vision, is colorblind, and/or is blind) to be able to more obtain audible descriptions that can identify one or more people who are relevant to the user, which provides improved feedback.

In some embodiments, the second audible description (e.g., 660b1, 660c1, 660d1, 660e1, 660f1, 660g, 660h, 660l, or 660m) (e.g., 650a, 650b, 650c, 650e, 650g, 650h, 650i, 650j, 650k, or 650l) of the portion (e.g., portion of representation 630 that includes 640, 642, or 644) (e.g., portion of representation 631 that includes 640, 642, or 644) of the media item is based on a context of objects detected in other portions (e.g., portion of representation 630 that does not include 640, 642, or 644) (e.g., portion of representation 631 that does not include 640, 642, or 644) of the representation of the media (e.g., identify a field of a receipt as a "total" or "merchant", sender from an envelope, recipient from an envelope) (e.g., the displayed portion of the representation of the media as a whole, the representation of the media as a whole that includes the displayed portion of the representation of the media and a portion of the representation of the media that is not displayed). Providing the second audible description based on a context of the representation of the media provides feedback to the user concerning a description that is based on the context of the media and, in particular, provides feedback for users who have vision accessibility needs (e.g., a user who have limited vision, is colorblind, and/or is blind) to be able to obtain audible descriptions that are relevant to the media item as a whole, which provides improved feedback.

In some embodiments, the second audible description (and/or the first audible description) is generated (e.g., created, made) by the computer system (and not a user of the computer system) (e.g., the second audible description is not a predefined audible description).

In some embodiments, the second audible description (e.g., 660b1, 660c1, 660d1, 660e1, 660f1, 660g, 660h, 660l, or 660m) was generated (e.g., created, made) after display of the portion of the representation of the media was changed. In some embodiments, the second audible description is generated in response to detecting the request to change display of the portion of the representation of the media. In some embodiments, the second audible description is generated in response to detecting the second input directed to the portion of the representation of the media.

In some embodiments, while displaying the representation (e.g., 630, 631, or 692) of the media, the computer system detects, via the one or more inputs devices a first input directed to a second portion (e.g., 650a, 650b, 650c, 650e, 650g, 650h, 650i, 650j, 650k, or 650l) of the representation of the media (e.g., a tap input/gesture (e.g., a single tap input, a multi-tap input)) and/or, in some embodiments, detecting a non-tap input/gesture (e.g., a press-and-hold input, a swipe input (e.g., a single finger swipe input, a multi-finger swipe input), a drag input). In some embodiments, the second portion (e.g., portion of representation 630 that includes 640, 642, or 644) (e.g., portion of representation 631 that includes 640, 642, or 644) (e.g., one or more of 692) is different from the portion (e.g., portion of representation 630 that includes 640, 642, or 644) (e.g., portion of representation 631 that includes 640, 642, or 644) (e.g., one or more of 692) of the representation of the media. In some embodiments, the first input is an input that is a part of a "next" gesture where the input is directed to the second portion by the portion being (e.g., being identified via the computer system as) the next portion of the representation (e.g., in a sequence of portions of the representation) when the input is received (e.g., where the input is a certain type of input). In some embodiments, the second input is not detected at a location that corresponds to the second portion of the representation of the media. In some embodiments, the first input directed to the second portion of the representation of the media is detected after (and, in some embodiments, before any other inputs are detected) the first input directed to the portion of the representation of the media. In some embodiments, the first input directed to the second portion of the representation of the media and the first input directed to the portion of the representation of the media are detected at the same location on the display. In some embodiments, in response to detecting the first input directed to the second portion of the representation of the media, the computer system provides, via the one or more output devices, a first audible description (e.g., 660b, 660c, 660d, 660e, 660f, 660g, 660h, 660l, or 660m) (e.g., 660b1, 660c1, 660d1, 660e1, 660f1, 660g, 660h, 660l, or 660m) that corresponds to the second portion of the representation of the media. In some embodiments, the first audible description (e.g., 660b, 660c, 660d, 660e, 660f, 660g, 660h, 660l, or 660m) (e.g., 660b1, 660c1, 660d1, 660e1, 660f1, 660g, 660h, 660l, or 660m) that corresponds to the second portion of the representation of the media is different from the first audible description (e.g., 660b, 660c, 660d, 660e, 660f, 660g, 660h, 660l, or 660m) (e.g., 660b1, 660c1, 660d1, 660e1, 660f1, 660g, 660h, 660l, or 660m) that corresponds to the portion of the representation of the media. Providing a first audible description that corresponds to the second portion of the representation of the media that is different from the first audible description that corresponds to the portion of the representation of the media in response to detecting the first input directed to the second portion of the representation of the media allows the user to obtain different audible descriptions about different requested portions of the representation of the media and, in particular, provides more control for users who have vision accessibility needs (e.g., a user who have limited vision, is colorblind, and/or is blind) to obtain more information concerning different portions of the media, which provides additional control options without cluttering the user interface.

In some embodiments, after providing the first audible description (e.g., 660b, 660c, 660d, 660e, 660f, 660g, 660h, 660l, or 660m) (e.g., 660b1, 660c1, 660d1, 660e1, 660f1, 660g, 660h, 660l, or 660m) that corresponds to the second portion of the representation of the media, the computer system detects, a request to change display of the second portion of the representation of the media. In some embodiments, in response to detecting the request to change display of the second portion (e.g., portion of representation 630 that includes 640, 642, or 644) (e.g., portion of representation

631 that includes 640, 642, or 644) of the representation of the media, the computer system changes the display of the second portion of the representation of the media (e.g., as described above in relation to FIGS. 6A, 6A1, 6B, or 6B1). In some embodiments, while display of the second portion of the representation of the media is changed, the computer system (e.g., 600) detects a second input (e.g., 650*a*, 650*b*, 650*c*, 650*e*, 650*g*, 650*h*, 650*i*, 650*j*, 650*k*, or 650*l*) (e.g., 660*b*1, 660*c*1, 660*d*1, 660*e*1, 660*f*1, 660*g*, 660*h*, 660*l*, or 660*m*) directed to the second portion of the representation of the media(e.g., a tap input/gesture (e.g., a single tap input, a multi-tap input) and/or, in some embodiments, detecting a non-tap input/gesture (e.g., a press-and-hold input, a swipe input (e.g., a single finger swipe input, a multi-finger swipe input), a drag input). In some embodiments, the second input is an input that is a part of a "next" gesture where the input is directed to the second portion by the portion being (e.g., being identified via the computer system as) the next portion of the representation (e.g., in a sequence of portions of the representation) when the input is received (e.g., where the input is a certain type of input). In some embodiments, the second input is not detected at a location that corresponds to the second portion of the representation of the media. In some embodiments, the second input directed to the second portion of the representation of the media is detected after (and, in some embodiments, before any other inputs are detected) the second input directed to the portion of the representation of the media. In some embodiments, in response to detecting the second input directed to the second portion of the representation of the media, the computer system provides, via the one or more output devices, a second audible description (e.g., 660*b*1, 660*c*1, 660*d*1, 660*e*1, 660*f*1, 660*g*, 660*h*, 660*l*, or 660*m*) that corresponds to the second portion of the representation of the media. In some embodiments, the second audible description that corresponds to the second portion of the representation of the media is different from the first audible description (e.g., 650*a*, 650*b*, 650*c*, 650*e*, 650*g*, 650*h*, 650*i*, 650*j*, 650*k*, or 650*l*) that corresponds to the second portion of the representation of the media (and the second audible description that corresponds to the second portion of the representation and/or the first audible description that corresponds to the portion of the representation). Providing a second audible description that corresponds to the second portion of the representation of the media while the display of the second portion of the representation of the media is changed, where the second audible description is different from the first audible description that corresponds to the second portion of the representation of the media that was provided before the second portion of the representation of the media was changed, provides feedback to the user concerning an audible description that is based on the current second portion of the representation of the media that is displayed, which improves feedback.

In some embodiments, the first input (e.g., 650*a*, 650*b*, 650*c*, 650*e*, 650*g*, 650*h*, 650*i*, 650*j*, 650*k*, or 650*l*) (e.g., 650*a*1, 650*b*1, 650*c*1, or 650*e*1) directed to the second portion (e.g., portion of representation 630 that includes 640, 642, or 644) (e.g., portion of representation 631 that includes 640, 642, or 644) of the representation of the media is a movement input (e.g., swipe input, drag input) that is moved from a location that corresponds to the portion (e.g., portion of representation 630 that includes 640, 642, or 644) (e.g., portion of representation 631 that includes 640, 642, or 644) of the representation of the media to the second portion of the representation of the media. In some embodiments, the movement input moves across a visual boarder that is displayed between the portion and the second portion of the representation of the media. Providing a first audible description that corresponds to the second portion of the representation of the media in response to detecting the first input directed that is a movement input allows the user to obtain different audible descriptions about different requested portions of the representation of the media and, in particular, provides more control for users who have vision accessibility needs (e.g., a user who have limited vision, is colorblind, and/or is blind) to obtain more information concerning different portions of the representation of the media, which provides additional control options without cluttering the user interface.

In some embodiments, in response to detecting the second input (e.g., 650*a*, 650*b*, 650*c*, 650*e*, 650*g*, 650*h*, 650*i*, 650*j*, 650*k*, or 650*l*) (e.g., 650*a*1, 650*b*1, 650*c*1, or 650*e*1) directed to the portion (e.g., portion of representation 630 that includes 640, 642, or 644) (e.g., portion of representation 631 that includes 640, 642, or 644) of the representation of the media and in accordance with a determination that the second input (e.g., 650*c*, 650*c*1) has been at a location of the portion of the representation for a predetermined period of time (e.g., 1, 3, 5 seconds), the computer system provides (e.g., outputting, issuing), via the one or more output devices, a fifth audible description (e.g., 650*d* or 650*d*1) that corresponds to the portion of the representation of the media (e.g., additional audible description). In some embodiments, the fifth audible description (e.g., 650*d* or 650*d*1) is different from the second audible description that corresponds to the portion of the representation of the media (and the first audible description) (e.g., after outputting the second audible description that corresponds to the portion of the representation of the media). In some embodiments, in accordance with a determination that the second input has not been at a location of the portion of the representation for a predetermined period of time, forgoing providing the fifth audible description. Providing a fifth audible description that corresponds to the portion of the representation of the media in accordance with a determination that the second input has been directed to a location of the portion of the representation for a predetermined period of time allows the user to control whether the computer system will output more information concerning the portion of the representation of the media and, in particular, provides more control for users who have vision accessibility needs (e.g., a user who have limited vision, is colorblind, and/or is blind) to obtain more information concerning the portion of the representation of the media, which provides additional control options without cluttering the user interface.

In some embodiments, the fifth audible description (e.g., 650*d* or 650*d*1) includes a description about the location (e.g., left side of media, right side of media, bottom of media, top of media, and/or center of media) of the portion of the representation of the media. Providing fifth audible description includes a description about the location of the portion of the representation of the media provides the user with feedback concerning the location of the portion of the representation of the media within the representation of the media and/or how the portion of the representation of the media related to other portions of the representation of the media, which improves feedback.

In some embodiments, the fifth audible description (e.g., 650*d* or 650*d*1) includes a description of one or more elements (e.g., object(s), face(s), text)) that are at (e.g., that are displayed at a location while the portion of the representation of the media is displayed) a location of a third portion (e.g., portion that includes 640 or 644) of the representation of the media that is different from the portion of the representation of the media. In some embodiments, the third portion of the representation of the media is nearby (e.g., adjacent to) the portion of the representation of the media. In some embodiments, the third portion of the representation is separated from the portion of the representation of the media by a border that is displayed between the third portion of the representation of the media and the portion of the representation of the media. Providing fifth audible description includes a description of one or more elements that are at location of a third portion of the representation of the media that is different from the portion of the representation of the media provides the user with feedback concerning how the portion of the representation of the media relates to another portion of the representation of the media and/or gives the user information concerning other portions of the representation of the media that can he relevant to the user, which improves feedback.

In some embodiments, the media is an image (e.g., a photo) that was captured by one or more cameras (e.g., one or more cameras of the computer system and/or another computer system) (e.g., as described above in relation to FIGS. 6A, 6A1, 6B, 6B1, or 6G-6H). In some embodiments, the media is an image (e.g., a screenshot) that was not captured by one or more cameras (e.g., one or more cameras of the computer system and/or another computer system) (e.g., as described above in relation to FIGS. 6A, 6A1, 6B, 6B1, or 6G-6H). In some embodiments, the media is a video (e.g., as described above in relation to FIGS. 6A, 6A1, 6B, 6B1, or 6G-6H). In some embodiments, the video was captured by one or more cameras. In some embodiments, the video was not captured by one or more cameras.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery of audio description. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and/or exercise information), date of birth, or any other identifying or personal information.

The present disclosure recognizes that the use of such personal information data, in the present technology, can be used to the benefit of users. For example, the personal information data can be used to deliver targeted audio descriptions that is of greater interest to the user. Accordingly, use of such personal information data enables users to have calculated control of the delivered audio descriptions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of audio delivery services, the present technology can be configured to allow users to select to "opt in" or "opt out" of participation in the collection of personal information data during registration for services or anytime thereafter. In another example, users can select not to provide data for targeted audio descriptions. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the audio delivery services, or publicly available information.

What is claimed is:

1. A computer system configured to communicate with a display generation component, one or more input devices, and one or more output devices, comprising:
    one or more processors; and
    memory storing one or more programs configured to be executed by the one or more processors, the one or more programs including instructions for:
        displaying, via the display generation component, a camera user interface that includes a representation of media;
        while displaying the representation of the media, detecting, via the one or more inputs devices, a first input directed to a portion of the representation of the media;
        in response to detecting the first input directed to the portion of the representation of the media, providing, via the one or more output devices, a first audible description that corresponds to the portion of the representation of the media;
        after providing the first audible description that corresponds to the portion of the representation of the media, detecting a request to change display of the portion of the representation of the media;
        in response to detecting the request to change display of the portion of the representation of the media, changing the display of the portion of the representation of the media;
        while the display of the portion of the representation of the media is changed, detecting a second input directed to the portion of the representation of the media; and
        in response to detecting the second input directed to the portion of the representation of the media, providing, via the one or more output devices, a second audible description that corresponds to the portion of the representation of the media, wherein the second audible description is different from the first audible description.

2. The computer system of claim 1, wherein the second audible description includes a description about the representation of the media as a whole that is provided before a description about the portion of the representation of the media is provided.

3. The computer system of claim 1, wherein the portion of the representation of the media is displayed at a first zoom level, the one or more programs further including instructions for:
    after providing, via the one or more output devices, the second audible description that corresponds to the portion of the representation of the media, detecting a request to zoom the representation of the media;
    in response to detecting the request to zoom the representation of the media, displaying the representation of the media displayed at a second zoom level that is different from the first zoom level;
    while displaying the representation of the media displayed at the second zoom level, detecting a third input directed to the portion of the representation of the media; and
    in response to detecting the third input directed to the portion of the representation of the media, providing, via the one or more output devices, a third audible description that corresponds to the portion of the representation of the media, wherein the third audible description is different from the first audible description and the second audible description.

4. The computer system of claim 1, the one or more programs further including instructions for:
    after providing, via the one or more output devices, the second audible description that corresponds to the portion of the representation of the media, detecting a request to scroll the representation of the media;
    in response to detecting the request to scroll the representation of the media, scrolling the representation of the media;
    while the representation of the media is scrolled, detecting a fourth input directed to the portion of the representation of the media; and
    in response to detecting the fourth input directed to the portion of the representation of the media, providing, via the one or more output devices, a fourth audible description that corresponds to the portion of the representation of the media, wherein the fourth audible description is different from the first audible description and the second audible description.

5. The computer system of claim 1, wherein providing the second audible description includes:
    in accordance with a determination that a first system language setting is set to a first language, providing the second audible description in the first language; and
    in accordance with a determination that the first system language setting is set to a second language that is different from the first language, providing the second audible description in the second language.

6. The computer system of claim 1, wherein the second audible description that corresponds to the portion of the representation of the media includes a third language, the one or more programs further including instructions for:
    after providing, via the one or more output devices, the second audible description that corresponds to the portion of the representation of the media, detecting a request to change a second system language setting of the computer system;
    in response to detecting the request to change the second system language setting of the computer system, setting the second system language setting from the third language to a fourth language that is different from the third language;
    while the second system language setting is set to the fourth language and while displaying the portion of the representation of the media, detecting a fifth input directed to the portion of the representation of the media; and in response to detecting the fifth input directed to the portion of the representation of the media, providing, via the one or more output devices, a fifth audible description that corresponds to the portion of the representation of the media, wherein the fifth audible description includes the fourth language.

7. The computer system of claim 1, wherein the second audible description includes a description of a face, an object, and/or text.

8. The computer system of claim 1, wherein the second audible description includes a description of a face that is identified based on information about one or more previously identified people.

9. The computer system of claim 1, wherein the second audible description of the portion of the media is based on a context of objects detected in other portions of the representation of the media.

10. The computer system of claim 1, wherein the second audible description is generated by the computer system.

11. The computer system of claim 1, wherein the second audible description was generated after display of the portion of the representation of the media was changed.

12. The computer system of claim 1, the one or more programs further including instructions for:
while displaying the representation of the media, detecting, via the one or more inputs devices a first input directed to a second portion of the representation of the media, wherein the second portion is different from the portion of the representation of the media; and in response to detecting the first input directed to the second portion of the representation of the media, providing, via the one or more output devices, a first audible description that corresponds to the second portion of the representation of the media, wherein the first audible description that corresponds to the second portion of the representation of the media is different from the first audible description that corresponds to the portion of the representation of the media.

13. The computer system of claim 12, the one or more programs further including instructions for:
after providing the first audible description that corresponds to the second portion of the representation of the media, detecting a request to change display of the second portion of the representation of the media;

in response to detecting the request to change display of the second portion of the representation of the media, changing the display of the second portion of the representation of the media;

while display of the second portion of the representation of the media is changed, detecting a second input directed to the second portion of the representation of the media; and in response to detecting the second input directed to the second portion of the representation of the media, providing, via the one or more output devices, a second audible description that corresponds to the second portion of the representation of the media, wherein the second audible description that corresponds to the second portion of the representation of the media is different from the first audible description that corresponds to the second portion of the representation of the media.

14. The computer system of claim 12, wherein the first input directed to the second portion of the representation of the media is a movement input that is moved from a location that corresponds to the portion of the representation of the media to the second portion of the representation of the media.

15. The computer system of claim 1, the one or more programs further including instructions for:
in response to detecting the second input directed to the portion of the representation of the media:
in accordance with a determination that the second input has been at a location of the portion of the representation of the media for a predetermined period of time, providing, via the one or more output devices, a fifth audible description that corresponds to the portion of the representation of the media, wherein the fifth audible description is different from the second audible description that corresponds to the portion of the representation of the media.

16. The computer system of claim 15, wherein the fifth audible description includes a description about the location of the portion of the representation of the media.

17. The computer system of claim 15, wherein the fifth audible description includes a description of one or more elements that are at a location of a third portion of the representation of the media that is different from the portion of the representation of the media.

18. The computer system of claim 1, wherein the media is an image that was captured by one or more cameras.

19. The computer system of claim 1, wherein the media is an image that was not captured by one or more cameras.

20. The computer system of claim 1, wherein the media is a video.

21. A non-transitory computer-readable storage medium storing one or more programs configured to be executed by one or more processors of a computer system that is in communication with a display generation component, one or more input devices, and one or more output devices, the one or more programs including instructions for:
displaying, via the display generation component, a camera user interface that includes a representation of media;

while displaying the representation of the media, detecting, via the one or more inputs devices, a first input directed to a portion of the representation of the media;

in response to detecting the first input directed to they portion of the representation of the media, providing, via the one or more output devices, a first audible description that corresponds to the portion of the representation of the media;

after providing the first audible description that corresponds to the portion of the representation of the media, detecting a request to change display of the portion of the representation of the media;

in response to detecting the request to change display of the portion of the representation of the media, changing the display of the portion of the representation of the media;

while the display of the portion of the representation of the media is changed, detecting a second input directed to the portion of the representation of the media; and in response to detecting the second input directed to the portion of the representation of the media, providing, via the one or more output devices, a second audible description that corresponds to the portion of the representation of the media, wherein the second audible description is different from the first audible description.

22. The non-transitory computer-readable storage medium of claim 21, wherein the second audible description includes a description about the representation of the media as a whole that is provided before a description about the portion of the representation of the media is provided.

23. The non-transitory computer-readable storage medium of claim 21, wherein the portion of the representation of the media is displayed at a first zoom level, the one or more programs further including instructions for:
- after providing, via the one or more output devices, the second audible description that corresponds to the portion of the representation of the media, detecting a request to zoom the representation of the media;
- in response to detecting the request to zoom the representation of the media, displaying the representation of the media displayed at a second zoom level that is different from the first zoom level;
- while displaying the representation of the media displayed at the second zoom level, detecting a third input directed to the portion of the representation of the media; and
- in response to detecting the third input directed to the portion of the representation of the media, providing, via the one or more output devices, a third audible description that corresponds to the portion of the representation of the media, wherein the third audible description is different from the first audible description and the second audible description.

24. The non-transitory computer-readable storage medium of claim 21, the one or more programs further including instructions for:
- after providing, via the one or more output devices, the second audible description that corresponds to the portion of the representation of the media, detecting a request to scroll the representation of the media;
- in response to detecting the request to scroll the representation of the media, scrolling the representation of the media;
- while the representation of the media is scrolled, detecting a fourth input directed to the portion of the representation of the media; and
- in response to detecting the fourth input directed to the portion of the representation of the media, providing, via the one or more output devices, a fourth audible description that corresponds to the portion of the representation of the media, wherein the fourth audible description is different from the first audible description and the second audible description.

25. The non-transitory computer-readable storage medium of claim 21, wherein providing the second audible description includes:
- in accordance with a determination that a first system language setting is set to a first language, providing the second audible description in the first language; and
- in accordance with a determination that the first system language setting is set to a second language that is different from the first language, providing the second audible description in the second language.

26. The non-transitory computer-readable storage medium of claim 21, wherein the second audible description that corresponds to the portion of the representation of the media includes a third language, the one or more programs further including instructions for:
- after providing, via the one or more output devices, the second audible description that corresponds to the portion of the representation of the media, detecting a request to change a second system language setting of the computer system;
- in response to detecting the request to change the second system language setting of the computer system, setting the second system language setting from the third language to a fourth language that is different from the third language;
- while the second system language setting is set to the fourth language and while displaying the portion of the representation of the media, detecting a fifth input directed to the portion of the representation of the media; and
- in response to detecting the fifth input directed to the portion of the representation of the media, providing, via the one or more output devices, a fifth audible description that corresponds to the portion of the representation of the media, wherein the fifth audible description includes the fourth language.

27. The non-transitory computer-readable storage medium of claim 21, wherein the second audible description includes a description of a face, an object, and/or text.

28. The non-transitory computer-readable storage medium of claim 21, wherein the second audible description includes a description of a face that is identified based on information about one or more previously identified people.

29. The non-transitory computer-readable storage medium of claim 21, wherein the second audible description of the portion of the media is based on a context of objects detected in other portions of the representation of the media.

30. The non-transitory computer-readable storage medium of claim 21, wherein the second audible description is generated by the computer system.

31. The non-transitory computer-readable storage medium of claim 21, wherein the second audible description was generated after display of the portion of the representation of the media was changed.

32. The non-transitory computer-readable storage medium of claim 21, the one or more programs further including instructions for:
- while displaying the representation of the media, detecting, via the one or more inputs devices a first input directed to a second portion of the representation of the media, wherein the second portion is different from the portion of the representation of the media; and
- in response to detecting the first input directed to the second portion of the representation of the media, providing, via the one or more output devices, a first audible description that corresponds to the second portion of the representation of the media, wherein the first audible description that corresponds to the second portion of the representation of the media is different from the first audible description that corresponds to the portion of the representation of the media.

33. The non-transitory computer-readable storage medium of claim 32, the one or more programs further including instructions for:
- after providing the first audible description that corresponds to the second portion of the representation of the media, detecting a request to change display of the second portion of the representation of the media;
- in response to detecting the request to change display of the second portion of the representation of the media, changing the display of the second portion of the representation of the media;

while display of the second portion of the representation of the media is changed, detecting a second input directed to the second portion of the representation of the media; and in response to detecting the second input directed to the second portion of the representation of the media, providing, via the one or more output devices, a second audible description that corresponds to the second portion of the representation of the media, wherein the second audible description that corresponds to the second portion of the representation of the media is different from the first audible description that corresponds to the second portion of the representation of the media.

34. The non-transitory computer-readable storage medium of claim 32, wherein the first input directed to the second portion of the representation of the media is a movement input that is moved from a location that corresponds to the portion of the representation of the media to the second portion of the representation of the media.

35. The non-transitory computer-readable storage medium of claim 21, the one or more programs further including instructions for:
in response to detecting the second input directed to the portion of the representation of the media:
in accordance with a determination that the second input has been at a location of the portion of the representation of the media for a predetermined period of time, providing, via the one or more output devices, a fifth audible description that corresponds to the portion of the representation of the media, wherein the fifth audible description is different from the second audible description that corresponds to the portion of the representation of the media.

36. The non-transitory computer-readable storage medium of claim 35, wherein the fifth audible description includes a description about the location of the portion of the representation of the media.

37. The non-transitory computer-readable storage medium of claim 35, wherein the fifth audible description includes a description of one or more elements that are at a location of a third portion of the representation of the media that is different from the portion of the representation of the media.

38. The non-transitory computer-readable storage medium of claim 21, wherein the media is an image that was captured by one or more cameras.

39. The non-transitory computer-readable storage medium of claim 21, wherein the media is an image that was not captured by one or more cameras.

40. The non-transitory computer-readable storage medium of claim 21, wherein the media is a video.

41. A method, comprising:
at a computer system that is in communication with a display generation component, one or more input devices, and one or more output devices:
displaying, via the display generation component, a camera user interface that includes a representation of media;
while displaying the representation of the media, detecting, via the one or more inputs devices, a first input directed to a portion of the representation of the media;
in response to detecting the first input directed to the portion of the representation of the media, providing, via the one or more output devices, a first audible description that corresponds to the portion of the representation of the media;
after providing the first audible description that corresponds to the portion of the representation of the media, detecting a request to change display of the portion of the representation of the media;
in response to detecting the request to change display of the portion of the representation of the media, changing the display of the portion of the representation of the media;
while the display of the portion of the representation of the media is changed, detecting a second input directed to the portion of the representation of the media; and
in response to detecting the second input directed to the portion of the representation of the media, providing, via the one or more output devices, a second audible description that corresponds to the portion of the representation of the media, wherein the second audible description is different from the first audible description.

42. The method of claim 41, wherein the second audible description includes a description about the representation of the media as a whole that is provided before a description about the portion of the representation of the media is provided.

43. The method of claim 41, wherein the portion of the representation of the media is displayed at a first zoom level, the method further comprising:
after providing, via the one or more output devices, the second audible description that corresponds to the portion of the representation of the media, detecting a request to zoom the representation of the media;
in response to detecting the request to zoom the representation of the media, displaying the representation of the media displayed at a second zoom level that is different from the first zoom level;
while displaying the representation of the media displayed at the second zoom level, detecting a third input directed to the portion of the representation of the media; and
in response to detecting the third input directed to the portion of the representation of the media, providing, via the one or more output devices, a third audible description that corresponds to the portion of the representation of the media, wherein the third audible description is different from the first audible description and the second audible description.

44. The method of claim 41, further comprising:
after providing, via the one or more output devices, the second audible description that corresponds to the portion of the representation of the media, detecting a request to scroll the representation of the media;
in response to detecting the request to scroll the representation of the media, scrolling the representation of the media;
while the representation of the media is scrolled, detecting a fourth input directed to the portion of the representation of the media; and
in response to detecting the fourth input directed to the portion of the representation of the media, providing, via the one or more output devices, a fourth audible description that corresponds to the portion of the representation of the media, wherein the fourth audible description is different from the first audible description and the second audible description.

45. The method of claim 41, wherein providing the second audible description includes:
   in accordance with a determination that a first system language setting is set to a first language, providing the second audible description in the first language; and
   in accordance with a determination that the first system language setting is set to a second language that is different from the first language, providing the second audible description in the second language.

46. The method claim 41, wherein the second audible description that corresponds to the portion of the representation of the media includes a third language, the method further comprising:
   after providing, via the one or more output devices, the second audible description that corresponds to the portion of the representation of the media, detecting a request to change a second system language setting of the computer system;
   in response to detecting the request to change the second system language setting of the computer system, setting the second system language setting from the third language to a fourth language that is different from the third language;
   while the second system language setting is set to the fourth language and while displaying the portion of the representation of the media, detecting a fifth input directed to the portion of the representation of the media; and
   in response to detecting the fifth input directed to the portion of the representation of the media, providing, via the one or more output devices, a fifth audible description that corresponds to the portion of the representation of the media, wherein the fifth audible description includes the fourth language.

47. The method of claim 41, wherein the second audible description includes a description of a face, an object, and/or text.

48. The method of claim 41, wherein the second audible description includes a description of a face that is identified based on information about one or more previously identified people.

49. The method of claim 41, wherein the second audible description of the portion of the media is based on a context of objects detected in other portions of the representation of the media.

50. The method of claim 41, wherein the second audible description is generated by the computer system.

51. The method of claim 41, wherein the second audible description was generated after display of the portion of the representation of the media was changed.

52. The method of claim 41, further comprising:
   while displaying the representation of the media, detecting, via the one or more inputs devices a first input directed to a second portion of the representation of the media, wherein the second portion is different from the portion of the representation of the media; and
   in response to detecting the first input directed to the second portion of the representation of the media, providing, via the one or more output devices, a first audible description that corresponds to the second portion of the representation of the media, wherein the first audible description that corresponds to the second portion of the representation of the media is different from the first audible description that corresponds to the portion of the representation of the media.

53. The method of claim 52, further comprising:
   after providing the first audible description that corresponds to the second portion of the representation of the media, detecting a request to change display of the second portion of the representation of the media;
   in response to detecting the request to change display of the second portion of the representation of the media, changing the display of the second portion of the representation of the media;
   while display of the second portion of the representation of the media is changed, detecting a second input directed to the second portion of the representation of the media; and
   in response to detecting the second input directed to the second portion of the representation of the media, providing, via the one or more output devices, a second audible description that corresponds to the second portion of the representation of the media, wherein the second audible description that corresponds to the second portion of the representation of the media is different from the first audible description that corresponds to the second portion of the representation of the media.

54. The method of claim 52, wherein the first input directed to the second portion of the representation of the media is a movement input that is moved from a location that corresponds to the portion of the representation of the media to the second portion of the representation of the media.

55. The method of claim 41, further comprising:
   in response to detecting the second input directed to the portion of the representation of the media:
     in accordance with a determination that the second input has been at a location of the portion of the representation of the media for a predetermined period of time, providing, via the one or more output devices, a fifth audible description that corresponds to the portion of the representation of the media, wherein the fifth audible description is different from the second audible description that corresponds to the portion of the representation of the media.

56. The method of claim 55, wherein the fifth audible description includes a description about the location of the portion of the representation of the media.

57. The method of claim 55, wherein the fifth audible description includes a description of one or more elements that are at a location of a third portion of the representation of the media that is different from the portion of the representation of the media.

58. The method of claim 41, wherein the media is an image that was captured by one or more cameras.

59. The method of claim 41, wherein the media is an image that was not captured by one or more cameras.

60. The method of claim 41, wherein the media is a video.

* * * * *

UNITED STATES PATENT AND TRADEMARK OFFICE
CERTIFICATE OF CORRECTION

PATENT NO. : 11,696,017 B2
APPLICATION NO. : 17/547065
DATED : July 4, 2023
INVENTOR(S) : Darren C. Minifie et al.

Page 1 of 1

It is certified that error appears in the above-identified patent and that said Letters Patent is hereby corrected as shown below:

In the Claims

Column 56, Line 45, Claim 21, delete "they" and insert --the--.

Column 61, Line 10, Claim 46, after "method", insert --of--.

Signed and Sealed this
Twenty-seventh Day of August, 2024

Katherine Kelly Vidal
*Director of the United States Patent and Trademark Office*